(12) United States Patent
Bartlett et al.

(10) Patent No.: US 11,880,124 B2
(45) Date of Patent: Jan. 23, 2024

(54) SCROLLING LASER ILLUMINATION WITH A PHASE LIGHT MODULATOR

(71) Applicant: TEXAS INSTRUMENTS INCORPORATED, Dallas, TX (US)

(72) Inventors: Terry Alan Bartlett, Dallas, TX (US); Kristofer Scott Oberascher, Van Alstyne, TX (US); Alexander Lyubarsky, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/539,039

(22) Filed: Nov. 30, 2021

(65) Prior Publication Data

US 2022/0197124 A1 Jun. 23, 2022

Related U.S. Application Data

(60) Provisional application No. 63/273,076, filed on Oct. 28, 2021, provisional application No. 63/126,622, filed on Dec. 17, 2020.

(51) Int. Cl.
*G03B 21/02* (2006.01)
*G02F 1/29* (2006.01)
*G03B 21/20* (2006.01)

(52) U.S. Cl.
CPC ........ *G03B 21/2066* (2013.01); *G02F 1/292* (2013.01); *G03B 21/208* (2013.01); *G03B 21/2013* (2013.01)

(58) Field of Classification Search
CPC ............ G03B 21/2066; G03B 21/2013; G03B 21/208; G03B 21/005; G02F 1/292; H04N 9/3126; H04N 9/3164
See application file for complete search history.

(56) References Cited

U.S. PATENT DOCUMENTS

| | | | |
|---|---|---|---|
| 8,052,286 B2 | 11/2011 | King et al. | |
| 9,848,176 B2 | 12/2017 | Damberg et al. | |
| 10,880,528 B1 | 12/2020 | Perkins et al. | |
| 2009/0161193 A1* | 6/2009 | Maeda | H04N 9/3161 359/263 |
| 2016/0004219 A1* | 1/2016 | Leister | H04N 9/3164 359/9 |
| 2017/0099466 A1 | 4/2017 | Damberg et al. | |
| 2018/0048873 A1* | 2/2018 | Damberg | H04N 9/3111 |
| 2018/0270457 A1* | 9/2018 | Damberg | G02B 27/18 |

(Continued)

FOREIGN PATENT DOCUMENTS

EP 1493283 B1 11/2005

OTHER PUBLICATIONS

International Search Report dated Apr. 7, 2022, PCT Application No. PCT/US2021/063014, 2 pages.

(Continued)

*Primary Examiner* — Magda Cruz
(74) *Attorney, Agent, or Firm* — Michelle F. Murray; Frank D. Cimino

(57) ABSTRACT

A display device includes laser light sources configured to emit respective light beams at respective wavelengths for respective color modes, a PLM configured to reflect and scroll the light beams on a projection surface, and lenses configured to project the light beams from the laser light sources onto respective nonoverlapping areas on the PLM.

20 Claims, 12 Drawing Sheets

(56) References Cited

U.S. PATENT DOCUMENTS

| | | | |
|---|---|---|---|
| 2020/0045273 A1* | 2/2020 | Bartlett | H04N 9/3164 |
| 2020/0336713 A1 | 10/2020 | Davies et al. | |
| 2020/0396427 A1* | 12/2020 | Takashima | H04N 9/3138 |
| 2021/0232093 A1* | 7/2021 | Madabhushi Balaji | H04N 9/3135 |

OTHER PUBLICATIONS

Written Opinion dated Apr. 7, 2022, PCT Application No. PCT/US2021/063014, 5 pages.

* cited by examiner

SCROLLING LASER ILLUMINATION WITH A PHASE LIGHT MODULATOR

CROSS-REFERENCE TO RELATED APPLICATIONS

The present application claims priority to U.S. Provisional Patent Application No. 63/126,622, which was filed Dec. 17, 2020, entitled "Scrolling Laser Illumination Plus High Dynamic Range (HDR) Using A Phase Light Modulator (PLM)," and to U.S. Provisional Patent Application No. 63/273,076, which was filed Oct. 28, 2021, entitled, "Scrolling Laser Illumination with a Phase Light Modulator," which Applications are hereby incorporated herein by reference in their entireties.

BACKGROUND

Projection-based displays project images onto surfaces such as onto a wall or a screen, to present video or still pictures. Such displays can include cathode-ray tube (CRT) displays, liquid crystal displays (LCDs), and digital mirror device (DMD) displays, etc. A display includes a display with adjustable display elements, which are usually arranged in a matrix of rows and columns. Each element of the display represents a pixel of an image that is to be projected. The elements are adjusted by an image processor to correspond to the brightness of the respective pixel in the image to be presented. The display system can also be based on one of various display schemes. In a time-sequential projection display system, light emitted by a light source, such as a lamp or light bulb, is separated by filters into basic color modes in a time sequence and projected on a single display. The sequence is set at a repetition rate sufficiently high to be combined by the human eye into a full image. Alternatively, in a scrolling color projection system, the color modes are projected and moved across the display at a sufficient scrolling rate to observe a full image by the human eye. The scrolling movement on the display is sometimes provided by a mechanical apparatus.

SUMMARY

In accordance with at least one example of the disclosure, an apparatus includes light sources, a projection lens, and a PLM positioned between the projection lens and the light sources, the PLM configured to simultaneously reflect light beams from the light sources toward the projection lens.

In accordance with another example of the disclosure, a display device includes laser light sources configured to emit respective light beams at respective wavelengths for respective color modes, a PLM configured to reflect and scroll the light beams on a projection surface, and lenses configured to project the light beams from the laser light sources onto respective nonoverlapping areas on the PLM.

In accordance with another example of the disclosure, an apparatus includes light sources, a projection lens, PLMs positioned between the projection lens and the light sources and aligned respectively with the light sources, and a spatial light modulator (SLM) positioned between the PLMs and the projection lens.

BRIEF DESCRIPTION OF THE DRAWINGS

For a detailed description of various examples, reference will now be made to the accompanying drawings in which.

DETAILED DESCRIPTION

Figure 1:
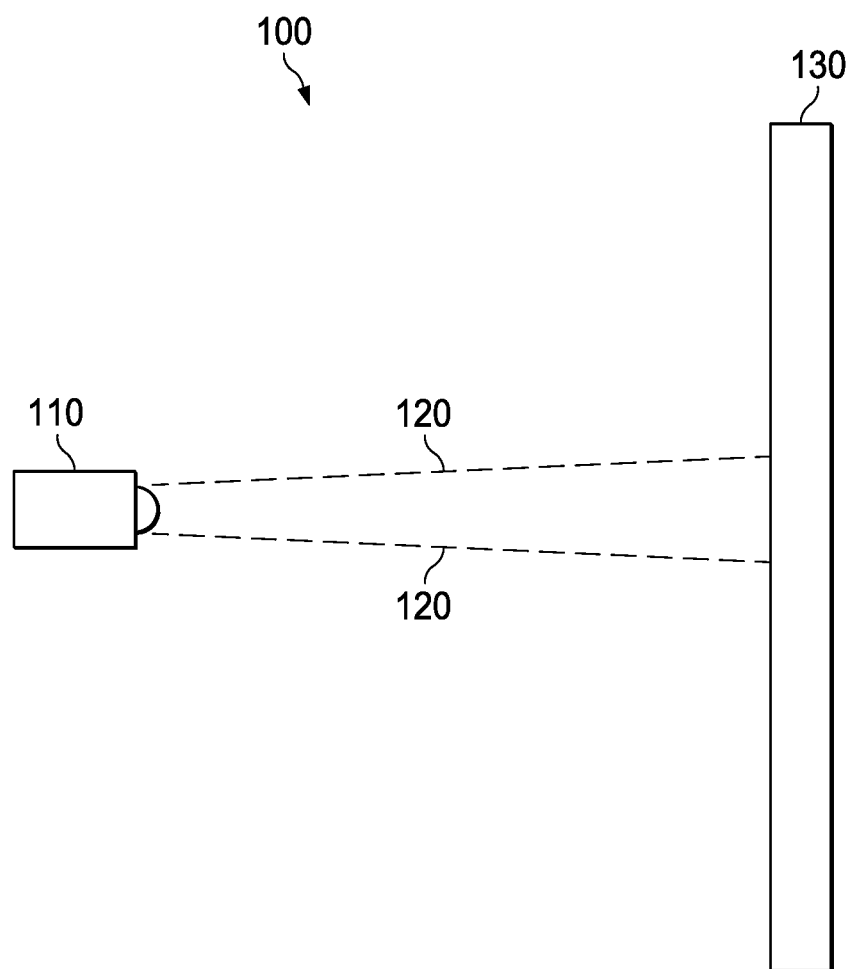
FIG. 1 is a block diagram of a display system, in accordance with various examples.

A projection-based display system may include an SLM device which includes optical elements, such as mirrors or apertures, to generate an image. An SLM modulates the intensity of the light beam projected on the display by controlling the optical elements to manipulate the light and form the pixels of an image. The SLM may be a DMD in which the optical elements are tilting micromirrors. Each micromirror projects a pixel of the image to be displayed. The micromirrors are tilted by applying voltages to the micromirrors to project dark, bright, or shades of light per pixel.

A projection-based display system may also include multiple light sources, such as laser light sources, of different wavelengths to provide the color modes rather than a single lamp or light bulb. The light sources can be operated by simultaneously projecting the color modes and scrolling light beams from the light sources across the SLM surface in time to form the image. The scrolling mechanism is sometimes achieved via mechanical mechanisms to scroll the light beams across the SLM. However, mechanical mechanisms for scrolling the light beams can introduce design challenges such as large size or high noise.

This description describes various examples of a PLM device to scroll light beams from respective light sources for a projection-based display system. A PLM may be a microelectromechanical system (MEMS) device including micromirrors that have adjustable heights with respect to the PLM surface. The heights of the micromirrors can be adjusted by applying voltages. The micromirrors may be controlled, such as in groups, with different voltages to form a diffraction surface on the PLM which is a phase altering reflective surface to the incident light beams from the light sources. The phase altering reflective surface may form holograms for projecting illumination patterns that form an image on a projection surface. The holograms are formed by adjusting the micromirrors to form the diffraction surface of the PLM. The micromirrors of the PLM may be further controlled by changing the voltages applied to the micromirrors to modify the diffraction surface and accordingly the hologram which changes the angles of reflected light beams with respect to the surface of the PLM. Changing the angles of the light beams causes the scrolling of the light beams on the projection surface.

In comparison to other devices with mechanical based components for light scrolling, the PLM provides the scrolling of the light beams without a mechanical apparatus and accordingly allows for reducing the device size and cost and the signal noise level. A PLM device may also allow the overlapping of light beams of different color modes providing additional color modes, as described in examples below. Accordingly, few laser light sources may be included in the device to provide a greater number of color modes. For example, the device may include two or three laser light sources and provide more than three color modes for image display. Overlapping the color modes may also increase color gamut flexibility. The PLM may also be operated according to HDR modulation techniques, as described in examples below, to increase brightness in images. The illumination areas of different color modes may also be increased, as described in examples below, which may be useful to compensate for the laser light source ability to provide sufficient light, also referred to herein as Etendue of the laser light source. Increasing the illumination area and accordingly the Etendue of the laser light source may increase the resolution of the image being projected by the device. The light sources may be turned on continuously to illuminate different portions of the PLM at different color modes resulting in higher average output power and thus brighter images.

According to various examples, the projection surface may be an SLM or a display. The light beams corresponding to the color modes can be scrolled by the PLM onto an SLM, which in turn projects light onto a display. A color mode of the light beam may depend on the light source of the light beam. The color mode may be the visible color of the light emitted by the light source, as perceived by a human eye, in accordance with the wavelength, a wavelength range, or a combination of wavelengths of the emitted light. Alternatively, the light beams may be scrolled by the PLM directly onto a display without an SLM in the projection-based display system. The projection-based display system may also include a projection lens between the SLM or PLM and the display, and lenses between the light sources and the PLM. The lenses adjust the illumination patterns of the light beams onto the surface of the PLM. In other examples, the system may include multiple PLMs for reflecting the respective color modes from the light sources. Each PLM may reflect a light beam of a color mode from a respective light source onto the SLM, the projection lens or the display. The system may also use HDR modulation techniques to spatially modulate the light distribution on the PLM or SLM to cause brighter areas in the image to receive more light intensity.

In examples, the system may include multiple SLMs, such as two or three SLMs, for projecting the light beams of different color modes provided by respective light sources. For example, the PLM may scroll one or two light beams for two respective color modes onto a first SLM, and a third light beam for a third color mode onto a second SLM. The first and second SLMs may project the light beams for the three color modes onto the projection surface. In another example, the PLM may scroll the light beam for each color mode onto a respective SLM. The color modes may be for blue, green, and red lights. Accordingly, the PLM may scroll a first light beam for the blue light onto a first SLM, a second light beam for the green light onto a second SLM, and a third light beam for the red light onto a third SLM. The three SLMs may project the respective light beams for the blue, green, and red lights onto the projection surface to form a full color image.

FIG. 1 is a block diagram of a display system 100, in accordance with various examples. The display system 100 may be a projection-based display system for projecting images or video. The display system 100 includes a display projector 110 configured to project light 120 onto a projection display 130, such as a screen or a wall. The light 120 may be controlled or modulated by the display projector 110 to project still images or moving images, such as video, on the projection display 130. The light 120 may be formed as a combination of light beams corresponding to multiple color modes provided by the display projector 110. The display projector 110 may include light sources (not shown) for providing the light beams at different wavelengths. The display projector 110 may also include optical components (not shown) for controlling the light beams to providing the images or video on the projection display 130. The display projector 110 may also include a controller (not shown) for controlling the components of the display projector 110 to display the images or video.

Figure 2:
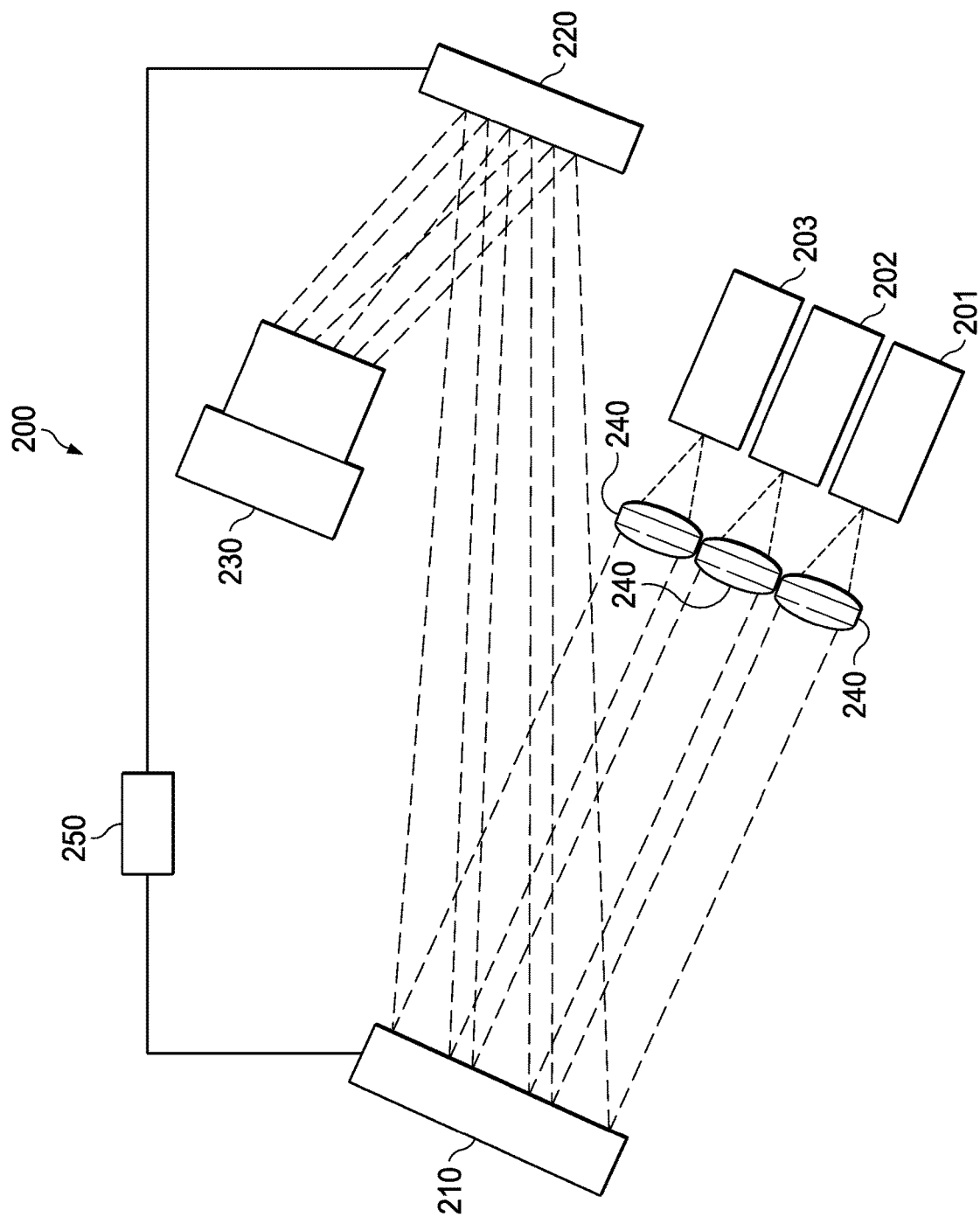
FIG. 2 is a block diagram of a display device, in accordance with various examples.

FIG. 2 is a block diagram of a display device 200 which may be part of the display projector 110, in accordance with various examples. The display device 200 may include light sources 201, 202, and 203, a PLM 210, an SLM 220, and a projection lens 230. The light sources 201, 202, and 203 may be any light emitting devices that emit respective light beams directed toward the PLM 210. The light sources 201, 202, and 203 may emit light in different wavelengths of different color modes. For example, the light sources 201, 202, and 203 may be laser light sources that emit light in the visible spectrum. The different light wavelength of the light sources 201, 202, and 203 may correspond to different colors of visible light, such as red, green, and blue. The display device 200 may also include lenses 240 positioned between the light sources 201, 202, and 203 and the PLM 210. Each one of the light sources 201, 202, and 203 may be aligned with a respective lens 240. The display device 200 may also include a controller 250 configured to control the operations of the PLM 210 and the SLM 220. The controller 250 may also control switching on and off the light sources 201, 202, and 203.

The PLM 210 may be configured to reflect the projected light beams from the light sources 201, 202, and 203 onto the SLM 220. The PLM 210 may be controlled by a the controller 250 to control the reflected light beams to the SLM 220 and provide illumination patterns on the surface of the SLM 220. The illumination patterns provide an image projected by the projection lens 230. The PLM 210 may include an array of micromirrors positioned on the surface of the PLM 210 and having adjustable heights with respect to the surface responsive to the voltage. The PLM 210 may be controlled by the controller 250 to provide variation in the heights of the micromirrors across the surface of the PLM 210. The heights of the micromirrors may be changed in steps, according to the applied voltage levels, to provide a phase variation on the surface of the PLM 210. The steps in heights may be provided according to the electronic components of the display projector 110. For example, the electronic components may include digital circuits with a bit size that determines the increment in steps or the number of steps. The variation in the heights of the micromirrors forms a diffraction surface on the PLM 210. The diffraction surface may be programmed to provide a hologram at the surface of the PLM 210 for reflecting the light beams from the light sources 201, 202, and 203 onto the SLM 220. The reflected light beams form, on the surface of the SLM 220, illumination patterns on the pixels of the SLM 220. The image may be formed by controlling the illuminated micromirrors of the SLM 220. The voltages applied to the PLM 210 may be varied in time, changing the diffraction surface of the PLM 210 to scroll the reflected light beams and scan the pixels on the SLM 220 that form the image. The micromirrors of the PLM 210 may be controlled to scroll the light beams onto the SLM 220 and illuminate the pixels of the SLM 220.

The SLM 220 may reflect the light beams from the PLM 210 onto the projection lens 230 to project the image. The SLM 220 may be controlled by the controller 250 to control the reflected light beams to the projection lens 230, which in turn projects the image to the projection display 130. The SLM 220 may include an array of tilting micromirrors positioned on the surface of the SLM 220 The micromirrors may be arranged in a 2D array on the surface of the SLM 220 and have two states (e.g., on and off) that can be switched by applying two respective voltage levels. Each micromirror of the SLM 220 may project a pixel of the image onto the projection lens 230. In the on state, the micromirrors of the SLM 220 may be tilted to a first angle to reflect the light beams from the PLM 210 to the projection lens 230. In the off state, the micromirrors may be tilted to a second angle to direct the light beams away from the projection lens 230, such as onto a heatsink or a light dump, making the respective pixels at the projection lens 230 appear dark. The micromirrors may be toggled on and off at a rate to cause the human eye to perceive shades of light at the pixels. The toggle ratio of on to off states may determine the shade of light provided at the pixel.

The projection lens 230 may include one or more lenses (not shown) to properly align the light beams from the SLM 220 onto the projection display 130 and project the light 120 on the projection display 130. The projection lens 230 may also include other optical components (not shown) for projecting aligning the light beams and projecting the light 120.

The lenses 240 are designed for projecting the respective light beams from the light sources 201, 202, and 203 onto a surface of the PLM 210. The lenses 240 may be designed to provide illumination patterns of the light beams on the surface of the PLM 210 in accordance with the illumination requirement for the images to be displayed. The lenses 240 may be positioned at respective distances and locations from the light sources 201, 202, and 203 to provide nonoverlapping illumination patterns of the light beams on the surface of the PLM 210. The light beams may have light intensity profiles based on the respective light sources 201, 202, and 203, such as a Gaussian profile. In examples, the lenses 240 may be configured and positioned to provide uniform illumination patterns of the light beams on the surface of the PLM 210. Responsive to applying voltages to the PLM 210 to form a diffraction surface and a respective hologram for reflecting the light beams, the illumination patterns on the surface of the PLM 210 are projected on the surface of the SLM 220 providing respective illumination patterns of the image.

Figure 3:
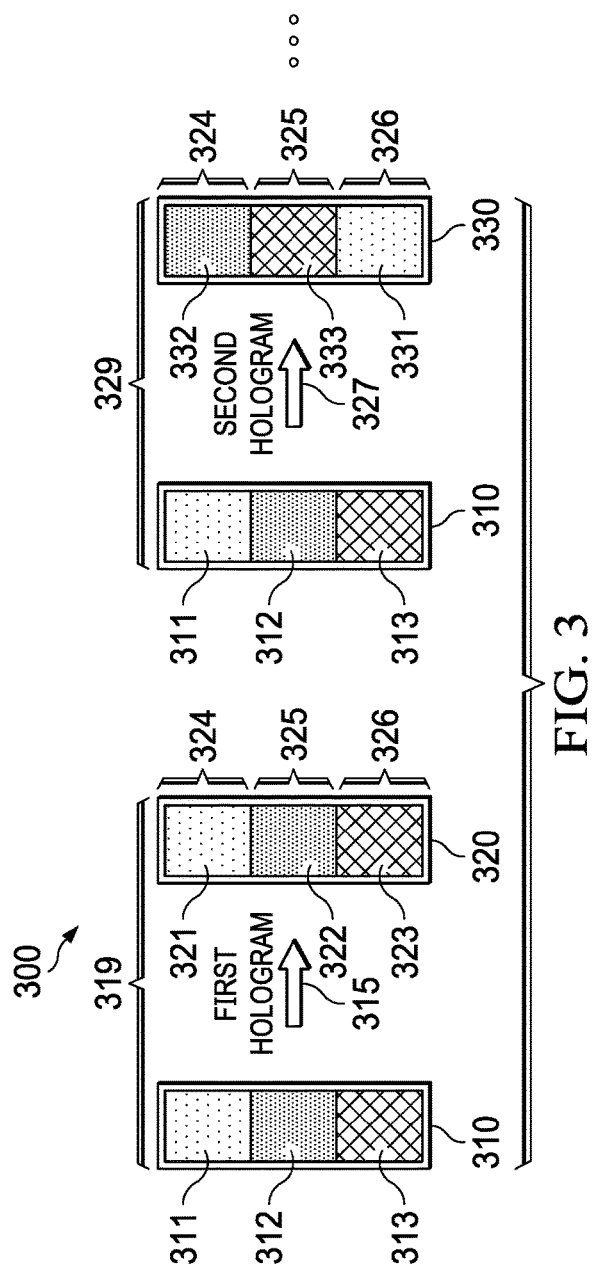
FIG. 3 is a block diagram of illumination projections in the display device of FIG. 2, in accordance with various examples.

FIG. 3 is a block diagram of illumination projections 300 in the display device 200, in accordance with various examples. The illumination projections 300 may be projected in a sequence of image subframes at a time rate causing the human eye to combine the image subframes into a single image. For example, the illumination projections 300 may be projected in a sequence of three or more subframes. The illumination projections 300 include a first illumination projection 310 of the light beams from the light sources 201, 202, and 203 on the PLM 210. The first illumination projection 310 includes first illumination patterns 311, 312, and 313 of the light sources 201, 202, and 203, respectively. The first illumination patterns 311, 312, and 313 may have nonoverlapping illumination areas on the PLM 210. The first illumination patterns 311, 312, and 313 may have a first arrangement on the surface of the PLM 210 where the color mode of the light source 202 is positioned between the respective color modes of the light sources 201 and 203, respectively. The PLM 210 may be controlled according to a first voltage setting to form a first hologram 315, which reflects the light beams from the PLM 210 providing, in a first subframe 319, a second illumination projection 320 of the light beams on the SLM 220. The second illumination projection 320 includes second illumination patterns 321, 322, and 323 of the first hologram 315 produced by the PLM 210 based on the light beams from the respective light sources 201, 202, and 203. The second illumination patterns 321, 322, and 323 may have nonoverlapping illumination areas on the SLM 220. The second illumination patterns 321, 322, and 323 may be projected on respective pixels or pixel portions 324, 325, and 326 at the SLM 220. According to the first hologram 315, the second illumination patterns 321, 322, and 323 may be projected to match the first arrangement of the first illumination patterns 311, 312, and 313 on the PLM 210, where the color mode of the light source 202 is projected at the pixel or pixel portion 325 between the respective color modes of the light sources 201 and 203 at the pixels or pixel portions 324 and 326, respectively.

To scroll the light beams on the SLM 220, the PLM 210 may be controlled according to a second voltage setting to form a second hologram 327, which provides in a second subframe 329 a third illumination projection 330 of the light beams on the SLM 220. The second hologram 327 causes the light beams of the first illumination patterns 311, 312, and 313 to be reflected from the PLM 210 to the SLM 220 at different angles than the first hologram 315 thereby scrolling the light beams on the surface of the SLM 220. The third illumination projection 330 includes third illumination patterns 331, 332, and 333 of the light beams of the respective light sources 201, 202, and 203. The third illumination patterns 331, 332, and 333 may have uniform and nonoverlapping illumination areas on the SLM 220. According to the second hologram 327, the third illumination patterns 331, 332, and 333 may be projected in a second arrangement different than the first arrangement of the first illumination patterns 311, 312, and 313 on the surface of the PLM 210. The third illumination patterns 331, 332, and 333 may be projected on the SLM 220 where the color mode of the light source 203 is projected at the pixel or pixel portion 325 between the respective color modes of the light sources 202 and 201 at the pixels or pixel portions 324 and 326, respectively. Switching from the first hologram 315 to the second hologram 327 provides the scrolling of each of the light beams of the light sources 201, 202, and 203 from the second illumination projection 320 to the third illumination projection 330. The scrolling of the light beams on the SLM 220 may be at a rate allowing the human eye to superimpose the second illumination patterns 321, 322, and 323 and the third illumination patterns 331, 332, and 333 with additional illumination patterns provided in subsequent subframes in the same pixels or pixel portions 324, 325, and 326 to perceive a single image.

Figure 4:
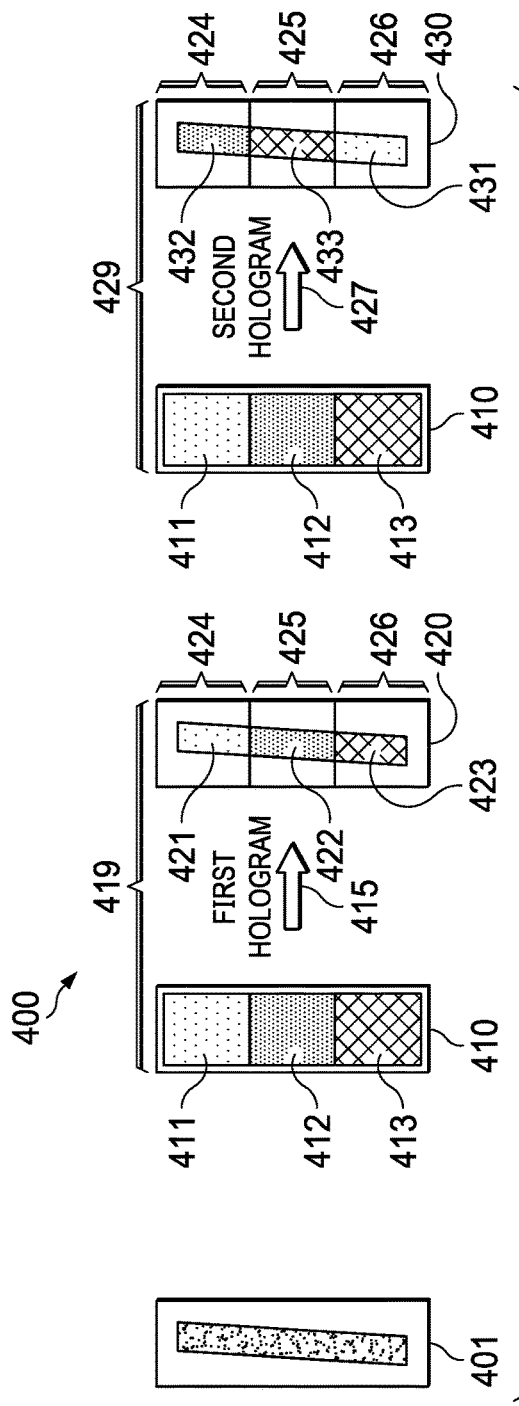
FIG. 4 is a block diagram of illumination projections of an HDR image pattern in the display device of FIG. 2, in accordance with various examples.

FIG. 4 is a block diagram of illumination projections 400 of an HDR image pattern 401 in the display device 200, in accordance with various examples. The illumination projections 400 may provide HDR images having brighter illumination and higher contrast, such as between bright and dark image portion within a pixel, in comparison to the images provided by the illumination projections 300 without HDR modulation. According to the HDR modulation, the scrolling of the light beams by the PLM 210 may be restricted to surface areas of the SLM 220 where the image is bright, excluding other areas. The HDR images may be provided by HDR modulation techniques for controlling the PLM 210, the SLM 220, or both. For example, the HDR image pattern 401 may be provided by an HDR modulation technique performed while controlling the light beams by the PLM 210 or both the PLM and SLM 220. According to HDR modulation, the light beams may be reflected and scrolled by the PLM 210 onto the SLM 220 to illuminate certain regions of the pixels and away from other regions. Restricting the illumination to regions of the pixels as such may display an image with higher contrast, where the illuminated pixel regions may project bright areas of the image while the remaining areas may appear dark.

The illumination projections 400 includes a first illumination projection 410 of the light beams from the light sources 201, 202, and 203 on the PLM 210. The first illumination projection 410 includes first illumination patterns 411, 412, and 413 of the light sources 201, 202, and 203, respectively. The first illumination patterns 411, 412, and 413 may have uniform and nonoverlapping illumination areas on the PLM 210. The first illumination patterns 411, 412, and 413 may be projected in a first arrangement on the PLM 210 where the color mode of the light source 202 is positioned between the respective color modes of the light sources 201 and 203, respectively. The PLM 210 may be controlled according to a first voltage setting to form a first hologram 415, which reflects the light beams from the PLM 210 providing, in a first subframe 419, a second illumination projection 420 of the light beams on the SLM 220. The second illumination projection 420 includes second illumination patterns 421, 422, and 423 of the light beams from the respective light sources 201, 202, and 203. The second illumination patterns 421, 422, and 423 may have uniform and nonoverlapping illumination areas on the SLM 220. The second illumination patterns 421, 422, and 423 may be projected on respective pixels or pixel portions 424, 425, and 426 at the SLM 220. The second illumination patterns 421, 422, and 423 may include HDR level contrast in each pixel portion 424, 425, and 426 where the image portions may be brighter than and illuminated without non-image portions in each pixel according to the HDR image pattern 401. According to the first hologram 415, the second illumination patterns 421, 422, and 423 may be projected to match the color distribution of the first illumination patterns 411, 412, and 413 on the PLM 210, where the color mode of the light source 202 is projected at the pixel or pixel portion 425 between the respective color modes of the light sources 201 and 203 at the pixels or pixel portions 424 and 426, respectively. The spatial distribution of the second illumination patterns 421, 422, and 423 may match the HDR image pattern 401.

To scroll the light beams on the SLM 220, the PLM 210 may be controlled according to a second voltage setting to form a second hologram 427, which provides in a second subframe 429 a third illumination projection 430 of the light beams on the SLM 220. The second hologram 427 causes the light beams of the first illumination patterns 411, 412, and 413 to be reflected from the PLM 210 to the SLM 220 at different angles than the first hologram 415 thereby scrolling the light beams on the surface of the SLM 220. The third illumination projection 430 includes third illumination patterns 431, 432, and 433 of the light beams formed by the second hologram 427 produced by PLM 210 from the respective light sources 201, 202, and 203. The third illumination patterns 431, 432, and 433 may have uniform and nonoverlapping illumination areas on the SLM 220. According to the second hologram 427, the third illumination patterns 431, 432, and 433 may be projected in a second arrangement different than the first arrangement of the first illumination patterns 411, 412, and 413 on the PLM 210. The third illumination patterns 431, 432, and 433 may be projected on the SLM 220 where the color mode of the light source 203 is projected at the pixel or pixel portion 425 between the respective color modes of the light sources 202 and 201 at the pixels or pixel portions 424 and 426, respectively. The third illumination patterns 431, 432, and 433 may include HDR level contrast in each pixel portion 424, 425, and 426 where the image portions may be brighter than and illuminated without non-image portions in each pixel according to the HDR image pattern 401. Switching from the first hologram 415 to the second hologram 427 provide the scrolling of each of the light beams of the light sources 201, 202, and 203 from the second illumination projection 420 to the third illumination projection 430. The scrolling of the light beams on the SLM 220 may be at a rate allowing the human eye to superimpose the second illumination patterns 421, 422, and 423 and the third illumination patterns 431, 432, and 433 with additional illumination patterns provided in subsequent subframes in the same pixels or pixel portions 424, 425, and 426 to perceive a single image.

Figure 5:
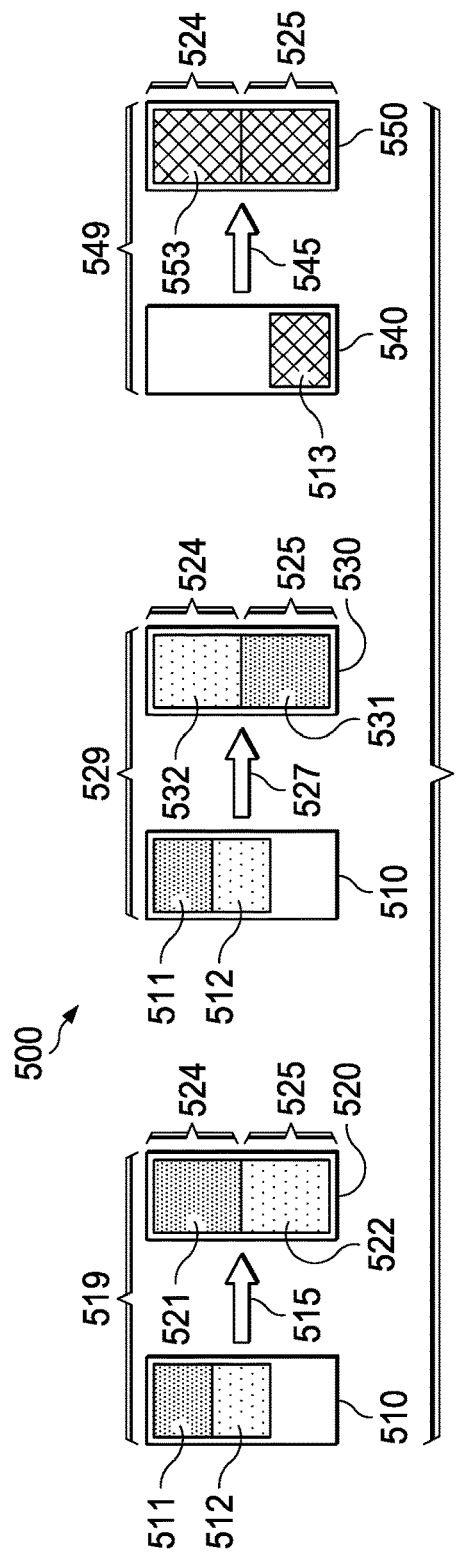
FIG. 5 is a block diagram of illumination projections in the display device of FIG. 2, in accordance with various examples.

FIG. 5 is a block diagram of illumination projections 500 in the display device 200, in accordance with various examples. The illumination projections 500 may be projected in a sequence of image subframes, such as three or more subframes. In each subframe, one or more of the light sources 201, 202 and 203 may be projected to provide an illumination pattern onto the PLM 210 and accordingly the SLM 220. The illumination projections 500 include a first illumination projection 510 of the light beams from the light sources 201 and 202 on the PLM 210. The first illumination projection 510 includes first illumination patterns 511 and 512 of the light sources 201 and 202, respectively, without the light source 203 which may be switched off during a first subframe 519. The first illumination patterns 511 and 512 may have uniform and nonoverlapping illumination areas on the PLM 210. The first illumination patterns 511 and 512 may have a first arrangement on the surface of the PLM 210. The PLM 210 may be controlled according to a first voltage setting to form a first hologram 515, which reflects the light beams from the PLM 210 providing, in the first subframe 519, a second illumination projection 520 on the SLM 220. The second illumination projection 520 includes second illumination patterns 521 and 522 of the light beams from the respective light sources 201 and 202. The second illumination patterns 521 and 522 may have uniform and nonoverlapping illumination areas on the SLM 220. The second illumination patterns 521 and 522 may be projected on respective pixels or pixel portions 524 and 525 at the SLM 220. According to the first hologram 515, the second illumination patterns 521 and 522 may be projected to match the first arrangement of the first illumination patterns 511 and 512 on the surface of the PLM 210.

To scroll the light beams of the light sources 201 and 202 on the SLM 220, the PLM 210 may be controlled according to a second voltage setting to form a second hologram 527, which provides in a second subframe 529 a third illumination projection 530 of the light beams on the SLM 220. The second hologram 527 causes the light beams of the first illumination patterns 511 and 512 to be reflected from the PLM 210 to the SLM 220 at different angles than the first hologram 515 thereby scrolling the light beams on the surface of the SLM 220. The third illumination projection 530 includes third illumination patterns 531 and 532 of the light beams of the respective light sources 201 and 202. The third illumination patterns 531 and 532 may have uniform and nonoverlapping illumination areas on the SLM 220. According to the second hologram 527, the third illumination patterns 531 and 532 may be projected on the SLM 220 in a second arrangement different than the first arrangement of the first illumination patterns 511 and 512 on the surface of the PLM 210. According to the second arrangement, the third illumination patterns 531 and 532 may be projected on the pixels or pixel portions 525 and 524, respectively.

The illumination projections 500 also include a fourth illumination projection 540 of the light beams from the light source 203 on the PLM 210. The fourth illumination projection 540 may be provided on the surface of the PLM 210 in a third subframe 549 after the first illumination projection 510. The fourth illumination projection 540 includes a single illumination pattern 513 of the light source 203 without the light sources 201 and 202, which may be switched off. The PLM 210 may be controlled according to a third voltage setting to form a third hologram 545, which reflects the light beam of the light source 203 from the PLM 210 providing in the third subframe 549 a fifth illumination projection 550 on the SLM 220. The fifth illumination projection 550 includes a single fifth illumination pattern 553 of the light source 203. The fifth illumination pattern 553 may provide a single color mode of the light source 203 projected on both the pixels or pixel portions 524 and 525 at the SLM 220. For example, the single color mode may be for blue light. The second illumination projection 520, third illumination projection 530, and fifth illumination projection 550 may be switched on the SLM 220 at a rate allowing the human eye to superimpose the second illumination patterns 521 and 522, third illumination patterns 531 and 532, and fifth illumination pattern 553 in the same pixels or pixel portions 524 and 525 to perceive a single image. The illumination patterns may be combined with additional illumination patterns in subsequent subframes to project a complete image.

Figure 6:
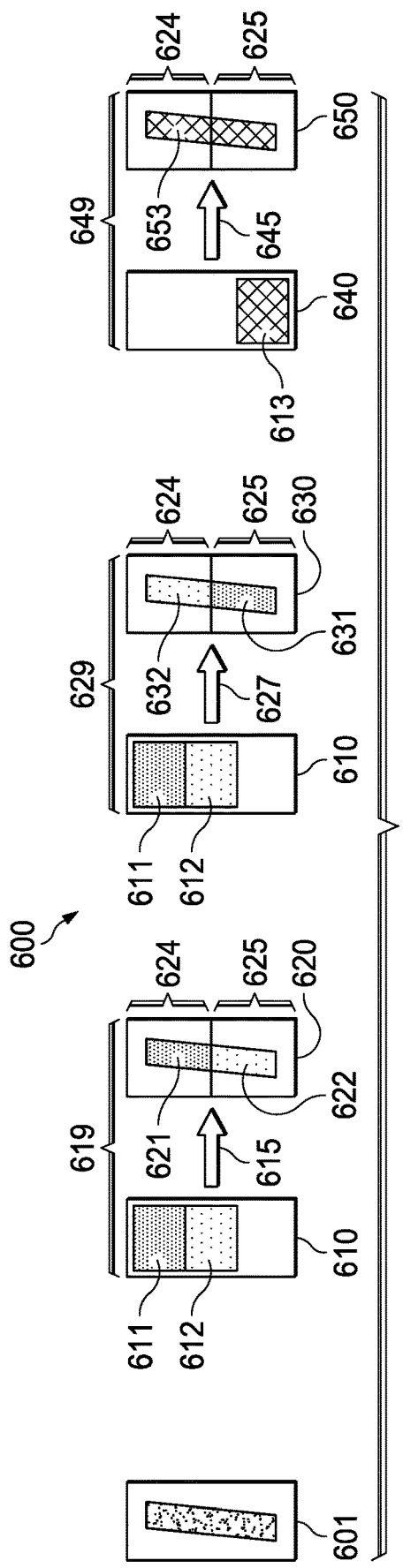
FIG. 6 is a block diagram of illumination projections of an HDR image pattern in the display device of FIG. 2, in accordance with various examples.

FIG. 6 is a block diagram of illumination projections 600 of an HDR image pattern 601 in the display device 200, in accordance with various examples. The illumination projections 600 may provide HDR images having brighter illumination and higher contrast in comparison to the images provided by the illumination projections 500 without HDR modulation. For example, the HDR image pattern 601 may be provided by an HDR modulation technique performed while controlling the light beams by the PLM 210, SLM 220, or both. The illumination projections 600 include a first illumination projection 610 of the light beams from the light sources 201 and 202 on the PLM 210. The first illumination projection 610 includes first illumination patterns 611 and 612 of the light sources 201 and 202, respectively, without the light source 203 which may be switched off. The first illumination patterns 611 and 612 may have uniform and nonoverlapping illumination areas on the PLM 210. The first illumination patterns 611 and 612 may be projected on the PLM 210 in a first arrangement. The PLM 210 may be controlled according to a first voltage setting to form a first hologram 615, which reflects the light beams from the PLM 210 providing, in a first subframe 619, a second illumination projection 620 on the SLM 220. The second illumination projection 620 includes second illumination patterns 621 and 622 of the light beams from the respective light sources 201 and 202. The second illumination patterns 621 and 622 may have uniform and nonoverlapping illumination areas on the SLM 220. The second illumination patterns 621 and 622 may be projected on respective pixels or pixel portions 624 and 625 at the SLM 220. The second illumination patterns 621 and 622 may include HDR level contrast in each pixel portion 624 and 625 where the image portions may be brighter than and illuminated without non-image portions in each pixel according to the HDR image pattern 601. According to the first hologram 615, the color distribution of the second illumination patterns 621 and 622 may be projected to match the color distribution of the first illumination patterns 611 and 612 on the PLM 210. The spatial distribution of the second illumination patterns 621 and 622 may match the HDR image pattern 601.

To scroll the light beams on the SLM 220, the PLM 210 may be controlled according to a second voltage setting to form a second hologram 627, which provides in a second subframe 629 a third illumination projection 630 of the light beams on the SLM 220. The second hologram 627 causes the light beams of the first illumination patterns 611 and 612 to be reflected from the PLM 210 to the SLM 220 at different angles than the first hologram 615 thereby scrolling the light beams on the surface of the SLM 220. The third illumination projection 630 includes third illumination patterns 631 and 632 of the light beams of the respective light sources 201 and 202. The third illumination patterns 631 and 632 may have uniform and nonoverlapping illumination areas on the SLM 220. According to the second hologram 627, the third illumination patterns 631 and 632 may be projected in a second arrangement different than the first arrangement of the first illumination patterns 611 and 612 on the PLM 210. According to the arrangement, the third illumination patterns 631 and 632 may be projected on the pixels or pixel portions 625 and 624, respectively. The third illumination patterns 631 and 632 may include HDR level contrast in each pixel portion 625 and 624 where the image portions may be brighter than and illuminated without non-image portions in each pixel according to the HDR image pattern 601.

The illumination projections 600 also include a fourth illumination projection 640 of the light beams from the light source 203 on the PLM 210. The fourth illumination projection 640 may be provided on the surface of the PLM 210 in a third subframe 649 after the first illumination projection 610. The fourth illumination projection 640 includes a single illumination pattern 613 of the light source 203 without the light sources 201 and 202, which may be switched off. The PLM 210 may be controlled according to a third voltage setting to form a third hologram 645, which reflects the light beam of the light source 203 from the PLM 210 providing in the third subframe 649 a fifth illumination projection 650 on the SLM 220. The fifth illumination projection 650 includes a single fifth illumination pattern 653 of the light source 203. The fifth illumination pattern 653 may provide a single color mode of the light source 203 projected on both the pixels or pixel portions 624 and 625 at the SLM 220. For example, the single color mode may be for blue light. The second illumination projection 620, third illumination projection 630, and fifth illumination projection 650 may be switched on the SLM 220 at a rate allowing the human eye to superimpose the second illumination patterns 621 and 622, third illumination patterns 631 and 632, and fifth illumination pattern 653 in the same pixels or pixel portions 624 and 625 to perceive a single image according to the HDR image pattern 601. The illumination patterns may be combined with additional illumination patterns in subsequent subframes to project a complete image.

Figure 7:
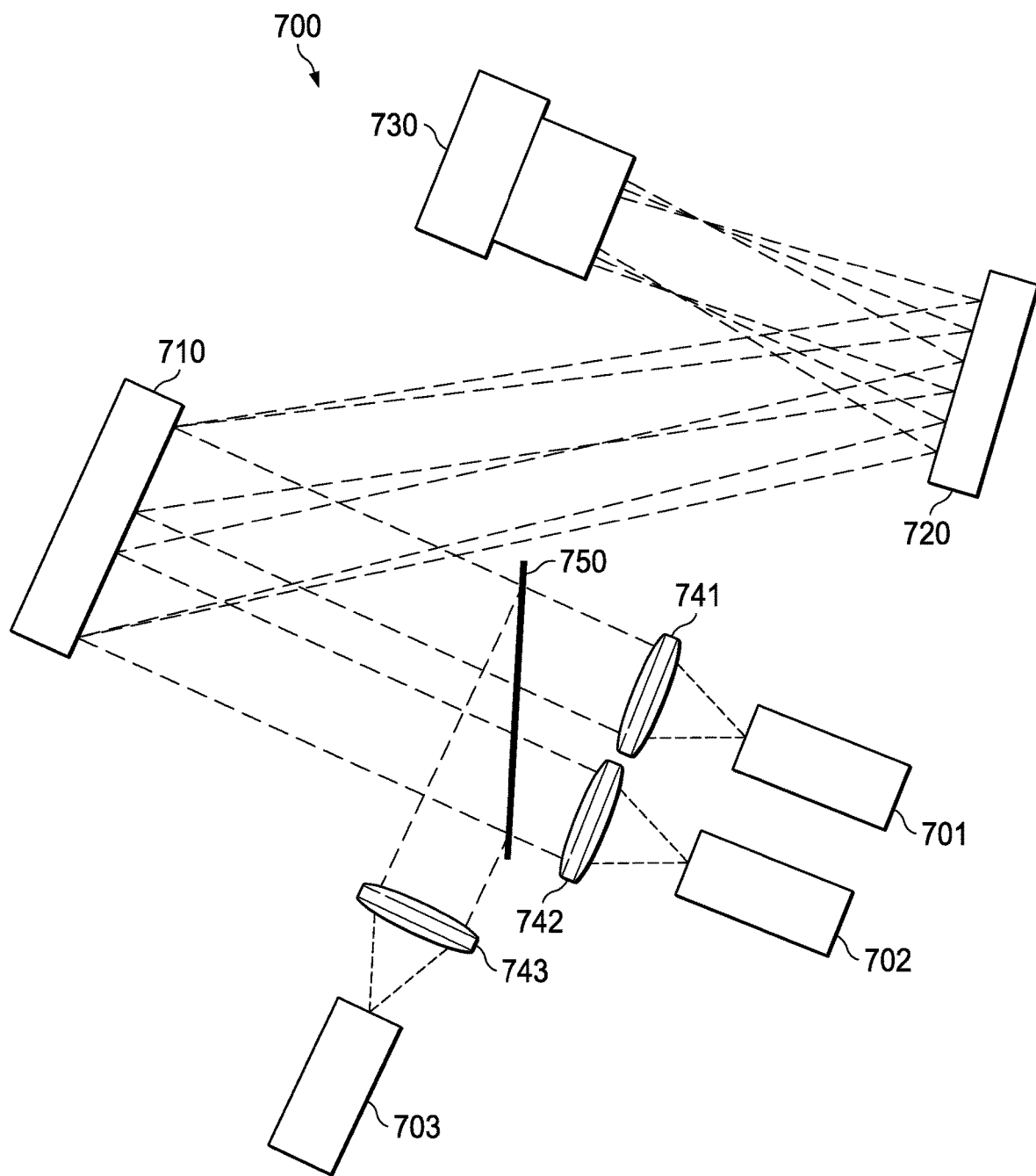
FIG. 7 is a block diagram of a display device, in accordance with various examples.

FIG. 7 is a block diagram of a display device 700 which may be part of the display projector 110, in accordance with various examples. The display device 700 may have a different arrangement of optical components than the display device 200. In FIG. 7, the display device 700 may include light sources 701, 702, and 703, a PLM 710, an SLM 720, and a projection lens 730. The light sources 701, 702, and 703 may be any light emitting devices that emit respective light beams, in different wavelengths of different color modes, directed toward the PLM 710. The display device 700 may also include lenses 741, 742, and 743 positioned between the light sources 701, 702, and 703, respectively, and the PLM 710. Each one of the light sources 701, 702, and 703 may be aligned with the respective lenses 741, 742, and 743. The lenses 741, 742, and 743 are designed for projecting the respective light beams from the light sources 701, 702, and 703 onto a surface of the PLM 710.

The lens 743 of the light source 703 may have a larger surface area or diameter than the lenses 741 and 742 of the respective light sources 701 and 702. The lens 743 may have a longer focal length than the lenses 741 and 742 to project a light beam with a larger width than the respective light beams projected by the lenses 741 and 742. The lenses 741 and 742 may have approximately the same surface area and may be positioned at respective distances and locations from the respective light sources 701 and 702 to provide uniform and nonoverlapping illumination patterns of the light beams on the surface of the PLM 710. The lenses 741 and 742 may have approximately the same focal length or different focal lengths based on the properties of the respective light sources 701 and 702, such as the divergence angles and the spatial dimensions of the respective light beams. The lens 743 may be positioned at a distance and location from the light source 703 to provide a larger illumination pattern for the light source 703 on the surface of the PLM 710 than the illumination patterns of the light sources 701 and 702 projected by the lenses 741 and 742. The lens 743 may be useful to provide a larger illumination area of the color mode of the light source 703 than the color modes of the light sources 701 and 702. For example, the illumination area of the light source 703 may overlap with both the illuminations areas of the light sources 701 and 702. The color mode of the light source 703 may be for blue light and the color modes of the light sources 701 and 702 may be for red light and green light.

The display device 700 may include a reflector 750 between the lenses 741, 742, and 743 and the PLM 710. The reflector 750 may be useful for projecting parallel light beams from the light sources 701, 702, and 703 on the surface of the PLM 710. For example, the reflector 750 may have a reflective coating that acts as a filter on a surface of the reflector 750 facing the light source 703 at an approximately 45 degrees (°) angle to reflect the light beam from the light source 703 at approximately 90° from the light source 703 to the PLM 710. For example, the coating may be designed to reflect blue light and transmit green and red light. The reflector 750 may also have a transparent surface facing the light sources 701 and 702 at approximately 45° to allow straight and parallel light beams to pass through from the light sources 701 and 702 to the PLM 710. In other examples, the angle between the reflector 750 and the light sources 701, 702, and 703 may be any suitable angle to project parallel light beams from the light sources 701, 702, and 703 onto the surface of the PLM 710. In examples, the reflector 750 may be a dichroic mirror or filter having different reflection and transmission properties for different wavelengths. The dichroic mirror or filter may be a prism that allows light beams, at wavelengths of the respective color modes of the light sources 701 and 702, to pass onto the PLM 710 and reflects a light beam, at a wavelength of the color mode of the lights source 703, at approximately 90° onto the PLM 710. In other examples, the reflector 750 may be a polarizing beam splitter (PBS) configured to split light into two light beams of two respective light polarization states. The PBS may be a cube that allows light beams, polarized in a first polarization state, to pass through from the light sources 701 and 702 to the PLM 710 and that reflects a light beam, polarized in a second polarization state, at approximately 90° from the light source 703 to the PLM 710.

Figure 8:
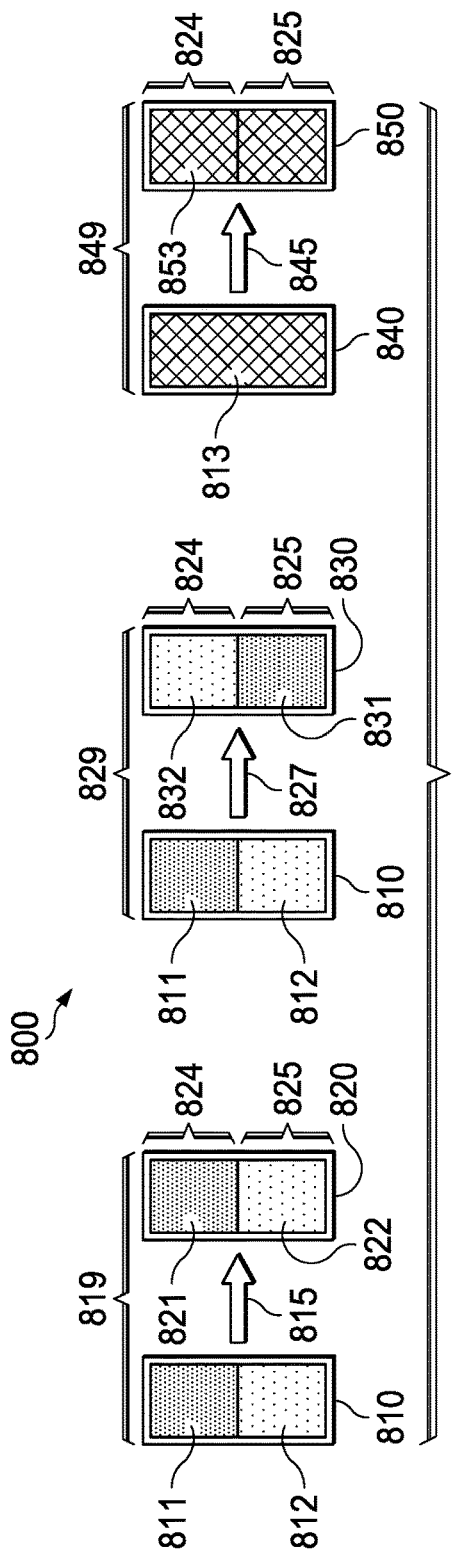
FIG. 8 is a block diagram of illumination projections in the display device of FIG. 7, in accordance with various examples.

FIG. 8 is a block diagram of illumination projections 800 in the display device 700, in accordance with various examples. The illumination projections 800 may be projected in a sequence of image subframes, such as three or more subframes. In each subframe, one or more of the light sources 701, 702 and 703 may be projected to provide an illumination pattern onto the PLM 710 and accordingly the SLM 720. The light beam of at least one of the light sources 701, 702 and 703 may cover a different size illumination area on the surface of the PLM 710 in comparison to the other light sources. For example, the light source 703 may project through the lens 743 a larger light beam that covers a larger area on the surface of the PLM 710 than the light sources 701 and 702. The illumination projections 800 include a first illumination projection 810 of the light beams from the light sources 701 and 702 on the PLM 710. The first illumination projection 810 includes first illumination patterns 811 and 812 of the light sources 701 and 702, respectively, without the light source 703 which may be switched off. The first illumination patterns 811 and 812 may have uniform and nonoverlapping illumination areas on the PLM 710. The first illumination patterns 811 and 812 may be projected in a first arrangement on the PLM 710. The PLM 710 may be controlled according to a first voltage setting to form a first hologram 815, which reflects the light beams from the PLM 710 providing, in a first subframe 819, a second illumination projection 820 of the light beams on the SLM 720. The second illumination projection 820 includes second illumination patterns 821 and 822 of the light beams from the respective light sources 701 and 702. The second illumination patterns 821 and 822 may have uniform and nonoverlapping illumination areas on the SLM 720. The second illumination patterns 821 and 822 may be projected on respective pixels or pixel portions 824 and 825 at the SLM 720. According to the first hologram 815, the second illumination patterns 821 and 822 may be projected to match the first arrangement of the first illumination patterns 811 and 812 on the PLM 710.

To scroll the light beams on the SLM 720, the PLM 710 may be controlled according to a second voltage setting to form a second hologram 827, which provides in a second subframe 829 a third illumination projection 830 of the light beams on the SLM 720. The second hologram 827 causes the light beams of the first illumination patterns 811 and 812 to be reflected from the PLM 710 to the SLM 720 at different angles than the first hologram 815 thereby scrolling the light beams on the surface of the SLM 720. The third illumination projection 830 includes third illumination patterns 831 and 832 of the light beams of the respective light sources 701 and 702. The third illumination patterns 831 and 832 may have uniform and nonoverlapping illumination areas on the SLM 720. According to the second hologram 827, the third illumination patterns 831 and 832 may be projected on the SLM 720 in a second arrangement different than the first arrangement of the first illumination patterns 811 and 812. According to the second arrangement, the third illumination patterns 831 and 832 may be projected on the pixels or pixel portions 825 and 824, respectively.

The illumination projections 800 also include a fourth illumination projection 840 of the light beams from the light source 703 on the PLM 710. The fourth illumination projection 840 may be provided on the surface of the PLM 710 in a third subframe 849 after the first illumination projection 810. The fourth illumination projection 840 includes a single fourth illumination pattern 813 of the light source 703 without the light sources 701 and 702, which may be switched off. The fourth illumination pattern 813 may cover a larger illumination area on the surface of the PLM 710 with respect to the first illumination patterns 811 and 812. The illumination area of the fourth illumination pattern 813 on the surface of the PLM 710 may be proportional to the larger surface area of the lens 743 with respect to the lenses 741 and 742. For example, the illumination area of the fourth illumination pattern 813 may be approximately equivalent to the combined illumination area of the first illumination patterns 811 and 812. The PLM 710 may be controlled according to a third voltage setting to form a third hologram 845, which reflects the light beams from the PLM 710 providing, in the third subframe 849, a fifth illumination projection 850 on the SLM 720. The fifth illumination projection 850 includes a single fifth illumination pattern 853 of the light source 703. The fifth illumination pattern 853 may provide a single color mode of the light source 703 projected on both the pixels or pixel portions 824 and 825 at the SLM 720. For example, the single color mode may be for blue light. The second illumination projection 820, third illumination projection 830, and fifth illumination projection 850 may be switched on the SLM 720 at a speed allowing the human eye to superimpose the second illumination patterns 821 and 822, third illumination patterns 831 and 832, and fifth illumination pattern 853 in the same pixels or pixel portions 824 and 825 to perceive a single image. The illumination patterns may be combined with additional illumination patterns in subsequent subframes to project a complete image.

Figure 9:
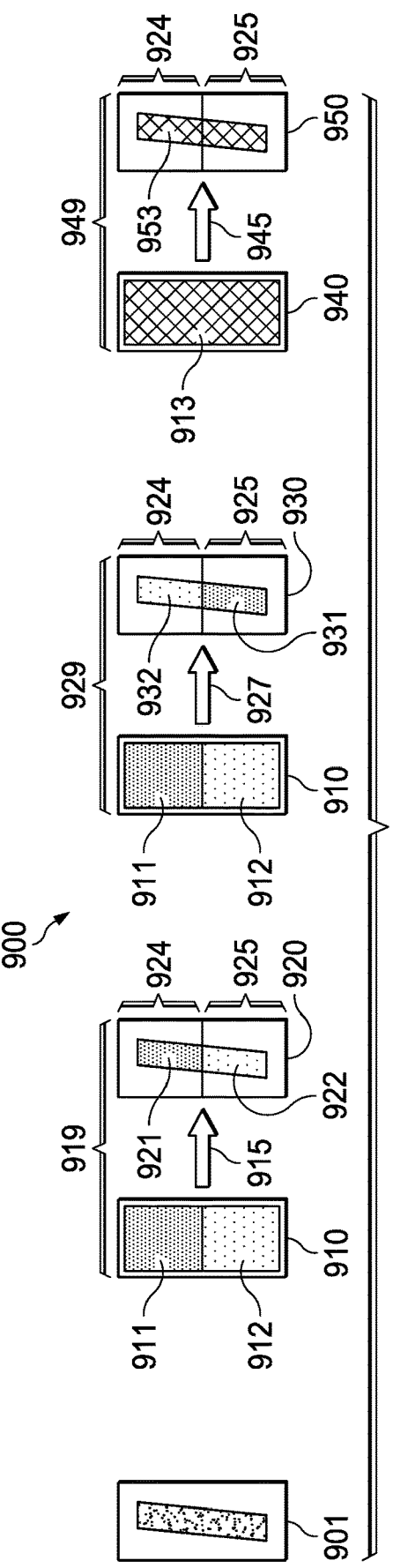
FIG. 9 is a block diagram of illumination projections of an HDR image pattern in the display device of FIG. 7, in accordance with various examples.

FIG. 9 is a block diagram of illumination projections 900 of an HDR image pattern 901 in the display device 700, in accordance with various examples. The illumination projections 900 may provide HDR images having brighter illumination and higher contrast in comparison to the images provided by the illumination projections 900 without HDR modulation. For example, the HDR image pattern 901 may be provided by an HDR modulation technique performed while controlling the light beams by the PLM 710, SLM 720, or both. The illumination projections 900 include a first illumination projection 910 of the light beams from the light sources 701 and 702 on the PLM 710. The first illumination projection 910 includes first illumination patterns 911 and 912 of the light sources 701 and 702, respectively, without the light source 703 which may be switched off. The first illumination patterns 911 and 912 may have uniform and nonoverlapping illumination areas on the PLM 710. The first illumination patterns 911 and 912 may be projected on the PLM 710 in a first arrangement. The PLM 710 may be controlled according to a first voltage setting to form a first hologram 915, which reflects the light beams from the PLM 710 providing, in a first subframe 919, a second illumination projection 920 on the SLM 720. The second illumination projection 920 includes second illumination patterns 921 and 922 of the light beams from the respective light sources 701 and 702. The second illumination patterns 921 and 922 may have uniform and nonoverlapping illumination areas on the SLM 720. The second illumination patterns 921 and 922 may be projected on the respective pixels or pixel portions 924 and 925 at the SLM 720. The second illumination patterns 921 and 922 may include HDR level contrast in each pixel portion 924 and 925 where the image portions may be brighter than and illuminated without non-image portions in each pixel according to the HDR image pattern 901. According to the first hologram 915, the second illumination patterns 921 and 922 may be projected to match the color distribution of the first illumination patterns 911 and 912 on the PLM 710. The spatial distribution of the second illumination patterns 921 and 922 may match the HDR image pattern 901.

To scroll the light beams on the SLM 720, the PLM 710 may be controlled according to a second voltage setting to form a second hologram 927, which provides in a second subframe 929 a third illumination projection 930 of the light beams on the SLM 720. The second hologram 927 causes the light beams of the first illumination patterns 911 and 912 to be reflected from the PLM 710 to the SLM 720 at different angles than the first hologram 915 thereby scrolling the light beams on the surface of the SLM 720. The third illumination projection 930 includes third illumination patterns 931 and 932 of the light beams of the respective light sources 701 and 702. The third illumination patterns 931 and 932 may have uniform and nonoverlapping illumination areas on the SLM 720. According to the second hologram 927, the third illumination patterns 931 and 932 may be projected on the SLM 720 in a second arrangement different than the first arrangement of the first illumination patterns 911 and 912. According to the second arrangement, the third illumination patterns 931 and 932 may be projected on the pixels or pixel portions 925 and 924, respectively. The third illumination patterns 931 and 932 may include HDR level contrast in each pixel portion 925 and 924 where the image portions may be brighter than and illuminated without non-image portions in each pixel according to the HDR image pattern 901.

The illumination projections 900 also include a fourth illumination projection 940 of the light beams from the light source 703 on the PLM 710. The fourth illumination projection 940 may be provided on the surface of the PLM 710 in a third subframe 949 after the first illumination projection 910. The fourth illumination projection 940 may include a single fourth illumination pattern 913 of the light source 703 without the light sources 701 and 702, which may be switched off. The fourth illumination pattern 913 may cover a larger illumination area on the surface of the PLM 710 with respect to the first illumination patterns 911 and 912. The illumination area of the fourth illumination pattern 913 on the surface of the PLM 710 may be proportional to the larger surface area of the lens 743 with respect to the lenses 741 and 742. For example, the illumination area of the fourth illumination pattern 913 may be approximately equivalent to the combined illumination area of the first illumination patterns 911 and 912. The PLM 710 may be controlled according to a third voltage setting to form a third hologram 945, which reflects the light beam of the light source 703 from the PLM 710 providing, in the third subframe 949, a fifth illumination projection 950 on the SLM 720. The fifth illumination projection 950 includes a single fifth illumination pattern 953 of the light source 703. The fifth illumination pattern 953 may provide a single color mode of the light source 703 projected on both the pixels or pixel portions 924 and 925 at the SLM 720. For example, the single color mode may be for blue light. The second illumination projection 920, third illumination projection 930, and fifth illumination projection 950 may be switched on the SLM 720 at a rate allowing the human eye to superimpose the second illumination patterns 921 and 922, third illumination patterns 931 and 932, and fifth illumination pattern 953 in the same pixels or pixel portions 924 and 925 to perceive a single image according to the HDR image pattern 901. The illumination patterns may be combined with additional illumination patterns in subsequent subframes to project a complete image.

Figure 10:
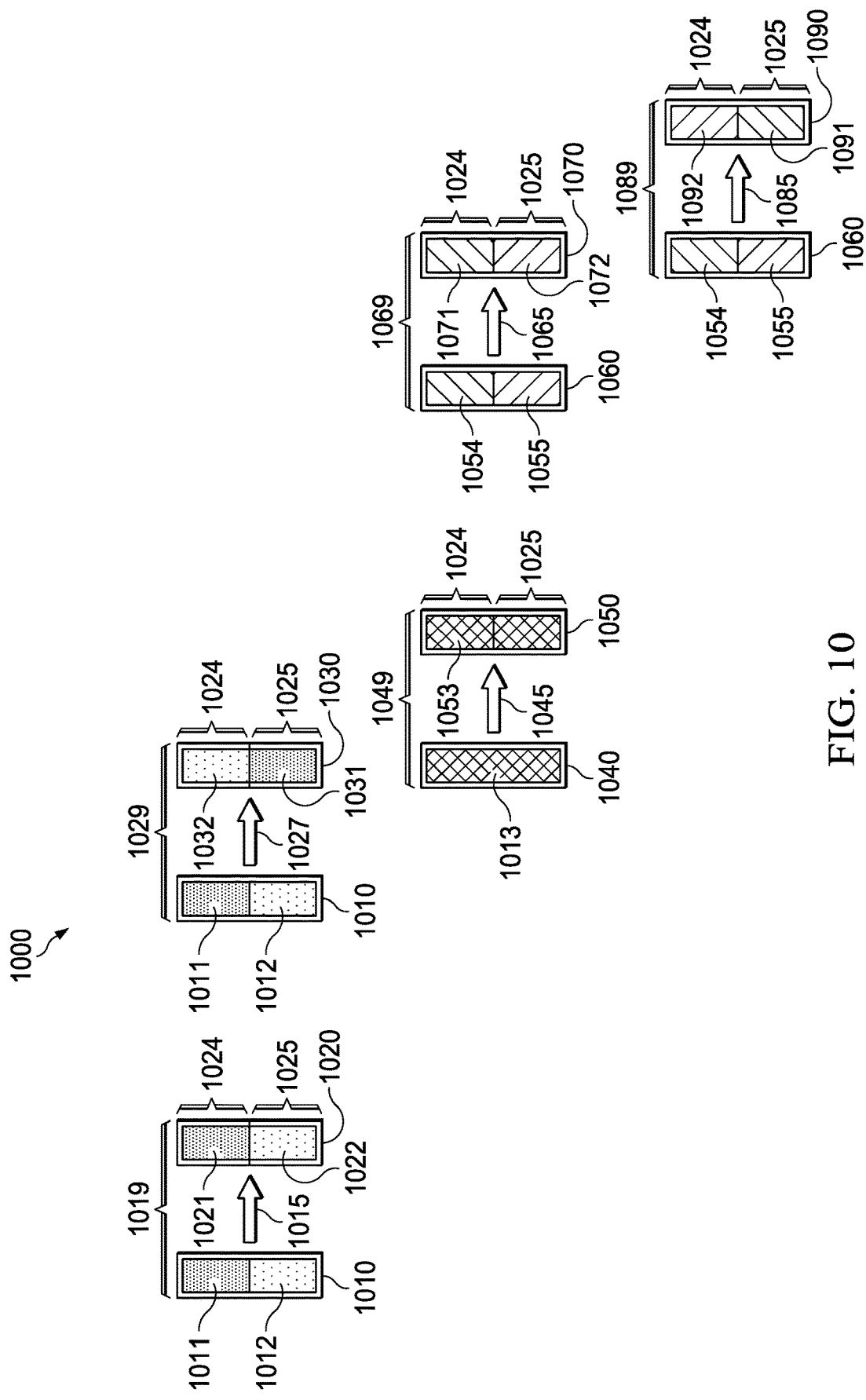
FIG. 10 is a block diagram of illumination projections in the display device of FIG. 7, in accordance with various examples.

FIG. 10 is a block diagram of illumination projections 1000 in the display device 700, in accordance with various examples. The illumination projections 1000 may be projected in a sequence of image subframes, such as three or more subframes. In each subframe, one or more of the light sources 701, 702 and 703 may be projected to provide an illumination pattern onto the PLM 710 and accordingly the SLM 720. The light beam of at least one of the light sources 701, 702 and 703 may cover a different size illumination area on the surface of the PLM 710 in comparison to the other light sources. For example, the light source 703 may project through the lens 743 a larger light beam that covers a larger area on the surface of the PLM 710 than the light sources 701 and 702. Two or more of the light sources 701, 702 and 703 may also be projected onto the same surface area of the PLM 710 to provide a new color mode. The new color mode may be a combination of the color modes of the light beams superimposed on the same surface area of the PLM 710. The illumination projections 1000 include a first illumination projection 1010 of the light beams from the light sources 701 and 702 on the PLM 710. The first illumination projection 1010 includes first illumination patterns 1011 and 1012 of the light sources 701 and 702, respectively, without the light source 703 which may be switched off. The first illumination patterns 1011 and 1012 may have uniform and nonoverlapping illumination areas on the PLM 710. The first illumination patterns 1011 and 1012 may be projected on the PLM 710 in a first arrangement. The PLM 710 may be controlled according to a first voltage setting to form a first hologram 1015, which reflects the light beams from the PLM 710 providing, in a first subframe 1019, a second illumination projection 1020 on the SLM 720. The second illumination projection 1020 includes second illumination patterns 1021 and 1022 of the light beams from the respective light sources 701 and 702. The second illumination patterns 1021 and 1022 may have uniform and nonoverlapping illumination areas on the SLM 720. The second illumination patterns 1021 and 1022 may be projected on respective pixels or pixel portions 1024 and 1025 at the SLM 720. According to the first hologram 1015, the second illumination patterns 1021 and 1022 may be projected to match the first arrangement of the first illumination patterns 1011 and 1012 on the PLM 710.

To scroll the light beams on the SLM 720, the PLM 710 may be controlled according to a second voltage setting to form a second hologram 1027, which provides in a second subframe 1029 a third illumination projection 1030 of the light beams on the SLM 720. The second hologram 1027 causes the light beams of the first illumination patterns 1011 and 1012 to be reflected from the PLM 710 to the SLM 720 at different angles than the first hologram 1015 thereby scrolling the light beams on the surface of the SLM 720. The third illumination projection 1030 includes third illumination patterns 1031 and 1032 of the light beams of the respective light sources 701 and 702. The third illumination patterns 1031 and 1032 may have uniform and nonoverlapping illumination areas on the SLM 720. According to the second hologram 1027, the third illumination patterns 1031 and 1032 may be projected on the SLM 720 in a second arrangement different than the first arrangement of the first illumination patterns 1011 and 1012. According to the second arrangement, the third illumination patterns 1031 and 1032 may be projected on the pixels or pixel portions 1025 and 1024, respectively.

The illumination projections 1000 include a fourth illumination projection 1040 of the light beams from the light source 703 on the PLM 710. The fourth illumination projection 1040 may be provided on the surface of the PLM 710 in a third subframe 1049 after the first illumination projection 1010. The fourth illumination projection 1040 includes a single fourth illumination pattern 1013 of the light source 703 without the light sources 701 and 702, which may be switched off. The fourth illumination pattern 1013 may cover a larger illumination area on the surface of the PLM 710 with respect to the first illumination patterns 1011 and 1012. The illumination area of the fourth illumination pattern 1013 on the surface of the PLM 710 may be proportional to the larger surface area of the lens 743 with respect to the lenses 741 and 742. For example, the illumination area of the fourth illumination pattern 1013 may be approximately equivalent to the combined illumination area of the first illumination patterns 1011 and 1012. The PLM 710 may be controlled according to a third voltage setting to form a third hologram 1045, which reflects the light beam of the light source 703 from the PLM 710 providing, in the third subframe 1049, a fifth illumination projection 1050 on the SLM 720. The fifth illumination projection 1050 includes a single fifth illumination pattern 1053 of the light source 703. The fifth illumination pattern 1053 may provide a single color mode of the light source 703 projected on both the pixels or pixel portions 1024 and 1025 at the SLM 720. For example, the single color mode may be for blue light.

The illumination projections 1000 also includes a sixth illumination projection 1060 with overlapping light beams from the light sources 701, 702, and 703 on the SLM 720. The sixth illumination projection 1060 includes overlapping illumination patterns 1054 and 1055 from the light sources 701, 702, and 703 in a fourth arrangement on the PLM 710. The sixth illumination projection 1060 may be provided in a fourth subframe 1069 as a combination of the first illumination projection 1010 and the fourth illumination projection 1040. The sixth illumination projection 1060 is a superposition of the first illumination patterns 1011 and 1012 and the single fourth illumination pattern 1013 on the PLM 710. For example, the first illumination patterns 1011 and 1012 may be uniform and nonoverlapping illumination areas of red light and green light, respectively, and the single fourth illumination pattern 1013 may be an illumination area of blue light that overlaps with the nonoverlapping illumination areas of red light and green light. Accordingly, the resulting overlapping illumination patterns 1054 and 1055 may be uniform and nonoverlapping illumination areas of magenta light and cyan light, respectively, on the PLM 710. The overlapping illumination patterns 1054 and 1055 may be projected on the PLM 710 in a third arrangement. The PLM 710 may be controlled according to a fourth voltage setting to form a fourth hologram 1065, which reflects the light beams from the PLM 710 providing, in the fourth subframe 1069, a seventh illumination projection 1070 of the light beams on the SLM 720. The seventh illumination projection 1070 includes second overlapping illumination patterns 1071 and 1072 of the same color modes of the overlapping illumination patterns 1054 and 1055, respectively. The second overlapping illumination patterns 1071 and 1072 may have uniform and nonoverlapping illumination areas on the SLM 720. The second overlapping illumination patterns 1071 and 1072 may be projected on respective pixels or pixel portions 1024 and 1025 at the SLM 720. According to the fourth hologram 1065, the second overlapping illumination patterns 1071 and 1072 may be projected to match the first arrangement of the overlapping illumination patterns 1054 and 1055 on the PLM 710.

To scroll the light beams on the SLM 720, the PLM 710 may be controlled according to a fifth voltage setting to form a fifth hologram 1085, which provides in a fifth subframe 1089 an eighth illumination projection 1090 of the light beams on the SLM 720. The fifth hologram 1085 causes the light beams of the sixth illumination projection 1060 to be reflected from the PLM 710 to the SLM 720 at different angles than the fourth hologram 1065 thereby scrolling the light beams on the surface of the SLM 720. The eighth illumination projection 1090 includes third overlapping illumination patterns 1091 and 1092 of the same color modes of the overlapping illumination patterns 1054 and 1055. The third overlapping illumination patterns 1091 and 1092 may have uniform and nonoverlapping illumination areas on the SLM 720. According to the fifth hologram 1085, the third overlapping illumination patterns 1091 and 1092 may be projected on the SLM 720 in a fourth arrangement different from the third arrangement of the overlapping illumination patterns 1054 and 1055. According to the fourth arrangement, the third overlapping illumination patterns 1091 and 1092 may be projected on the pixels or pixel portions 1025 and 1024 respectively.

The second illumination projection 1020, third illumination projection 1030, fifth illumination projection 1050, seventh illumination pattern 1070, and eighth illumination projection 1090 may be switched on the SLM 720 at a rate allowing the human eye to superimpose the second illumination patterns 1021 and 1022, third illumination patterns 1031 and 1032, fifth illumination pattern 1053, second overlapping illumination patterns 1071 and 1072, and third overlapping illumination patterns 1091 and 1092 in the same pixels or pixel portions 1024 and 1025 to perceive a single image. The illumination patterns may be combined with additional illumination patterns in subsequent subframes to project a complete image.

Figure 11:
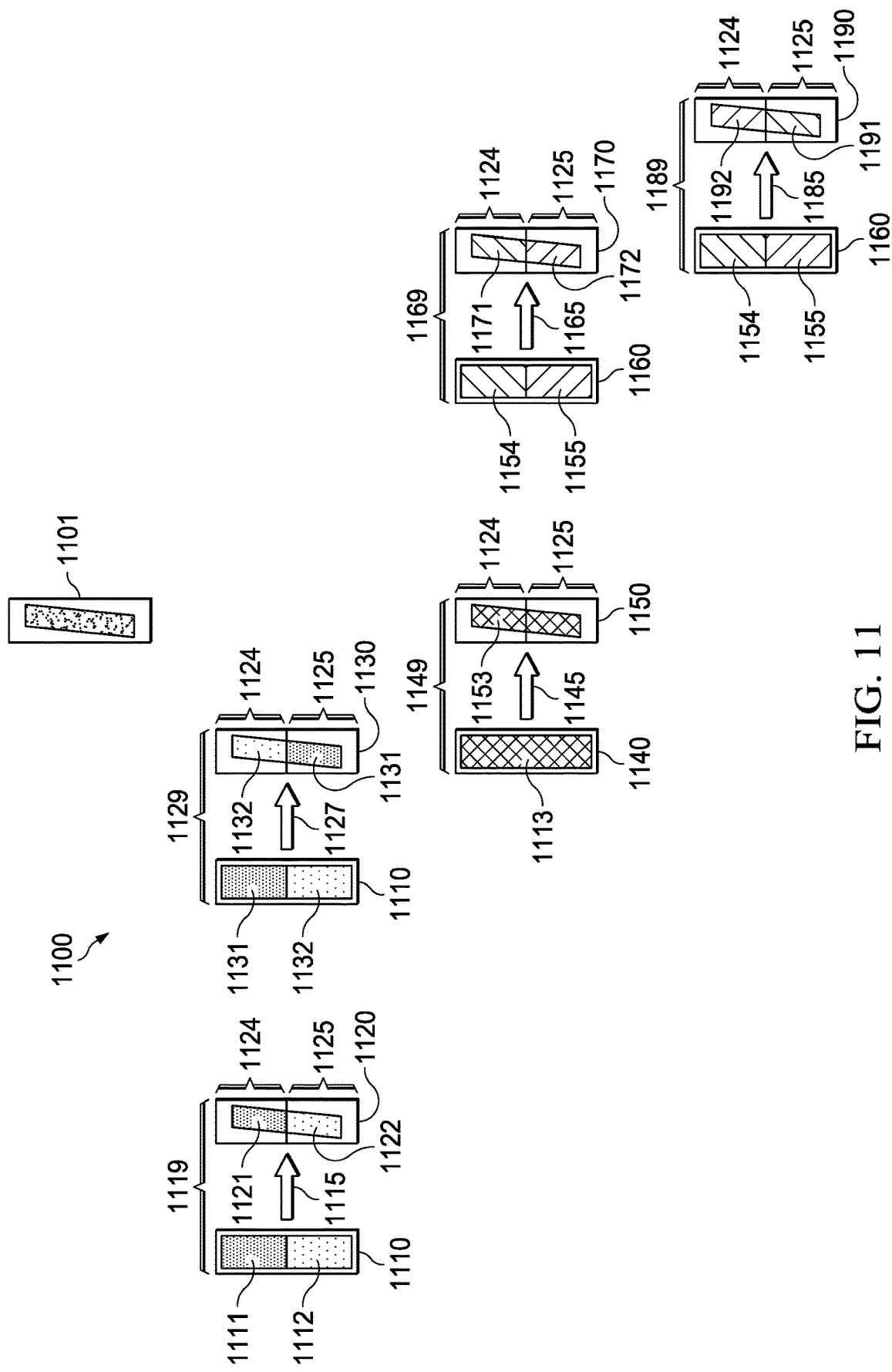
FIG. 11 is a block diagram of illumination projections of an HDR image pattern in the display device of FIG. 7, in accordance with various examples.

FIG. 11 is a block diagram of illumination projections 1100 of an HDR image pattern 1101 in the display device 700, in accordance with various examples. The illumination projections 1100 may provide HDR images having brighter illumination and higher contrast in comparison to the images provided by the illumination projections 1100 without HDR modulation. For example, the HDR image pattern 1101 may be provided by an HDR modulation technique performed while controlling the light beams by the PLM 710, SLM 720, or both. The illumination projections 1100 include a first illumination projection 1110 of the light beams from the light sources 701 and 702 on the PLM 710. The first illumination projection 1110 includes first illumination patterns 1111 and 1112 of the light sources 701 and 702, respectively, without the light source 703 which may be switched off. The first illumination patterns 1111 and 1112 may have uniform and nonoverlapping illumination areas on the PLM 710. The first illumination patterns 1111 and 1112 may be projected on the PLM 710 in a first arrangement. The PLM 710 may be controlled according to a first voltage setting to form a first hologram 1115, which reflects the light beams from the PLM 710 providing, in a first subframe 1119, a second illumination projection 1120 on the SLM 720. The second illumination projection 1120 includes second illumination patterns 1121 and 1122 of the light beams from the respective light sources 701 and 702. The second illumination patterns 1121 and 1122 may have uniform and nonoverlapping illumination areas on the SLM 720. The second illumination patterns 1121 and 1122 may be projected on respective pixels or pixel portions 1124 and 1125 at the SLM 720. The second illumination patterns 1121 and 1122 may include HDR level contrast in each pixel portion 1124 and 1125 where the image portions may be brighter than and illuminated without non-image portions in each pixel according to the HDR image pattern 1101. According to the first hologram 1115, the second illumination patterns 1121 and 1122 may be projected to match the color distribution of the first illumination patterns 1111 and 1112 on the PLM 710. The spatial distribution of the second illumination patterns 1121 and 1122 may match the HDR image pattern 1101.

To scroll the light beams on the SLM 720, the PLM 710 may be controlled according to a second voltage setting to form a second hologram 1127, which provides in a second subframe 1129 a third illumination projection 1130 of the light beams on the SLM 720. The second hologram 1127 causes the light beams of the first illumination patterns 1111 and 1112 to be reflected from the PLM 710 to the SLM 720 at different angles than the first hologram 1115 thereby scrolling the light beams on the surface of the SLM 720. The third illumination projection 1130 includes third illumination patterns 1131 and 1132 of the light beams of the respective light sources 701 and 702. The third illumination patterns 1131 and 1132 may have uniform and nonoverlapping illumination areas on the SLM 720. According to the second hologram 1127, the third illumination patterns 1131 and 1132 may be projected on the SLM 720 in a second arrangement different than the first arrangement of the first illumination patterns 1111 and 1112. According to the second arrangement, the third illumination patterns 1131 and 1132 may be projected on the pixels or pixel portions 1125 and 1124, respectively. The third illumination patterns 1131 and 1132 may include HDR level contrast in each pixel portion 1125 and 1124 where the image portions may be brighter than and illuminated without non-image portions in each pixel according to the HDR image pattern 1101.

The illumination projections 1100 include a fourth illumination projection 1140 of the light beams from the light source 703 on the PLM 710. The fourth illumination projection 1140 may be provided on the surface of the PLM 710 in a third subframe 1149 after the first illumination projection 1110. The fourth illumination projection 1140 includes a single fourth illumination pattern 1113 of the light source 703 without the light sources 701 and 702, which may be switched off. The fourth illumination pattern 1113 may cover a larger illumination area on the surface of the PLM 710 with respect to the first illumination patterns 1111 and 1112. The illumination area of the fourth illumination pattern 1113 on the surface of the PLM 710 may be proportional to the larger surface area of the lens 743 with respect to the lenses 741 and 742. For example, the illumination area of the fourth illumination pattern 1113 may be approximately equivalent to the combined illumination area of the first illumination patterns 1111 and 1112. The PLM 710 may be controlled according to a third voltage setting to form a third hologram 1145, which reflects the light beam of the light source 703 from the PLM 710 providing, in the third subframe 1149, a fifth illumination projection 1150 on the SLM 720. The fifth illumination projection 1150 includes a single fifth illumination pattern 1153 of the light source 703. The fifth illumination pattern 1153 may provide a single color mode of the light source 703 projected on both the pixels or pixel portions 1124 and 1125 at the SLM 720. For example, the single color mode may be for blue light.

The illumination projections 1100 also includes a sixth illumination projection 1160 with overlapping light beams from the light sources 701, 702, and 703 on the SLM 720. The sixth illumination projection 1160 includes overlapping illumination patterns 1154 and 1155 from the light sources 701, 702, and 703 in a fourth arrangement on the PLM 710. The sixth illumination projection 1160 may be provided in a fourth subframe 1169 as a combination of the first illumination projection 1110 and the fourth illumination projection 1140. The sixth illumination projection 1160 is a superposition of the first illumination patterns 1111 and 1112 and the single fourth illumination pattern 1113 on the PLM 710. For example, the first illumination patterns 1111 and 1112 may be uniform and nonoverlapping illumination areas of red light and green light, respectively, and the single fourth illumination pattern 1113 may be an illumination area of blue light that overlaps with the nonoverlapping illumination areas of red light and green light. Accordingly, the resulting overlapping illumination patterns 1154 and 1155 may be uniform and nonoverlapping illumination areas of magenta light and cyan light, respectively, on the PLM 710. The overlapping illumination patterns 1154 and 1155 may be projected on the PLM 710 in a third arrangement. The PLM 710 may be controlled according to a fourth voltage setting to form a fourth hologram 1165, which reflects the light beams form the PLM 710 providing, in the fourth subframe 1169, a seventh illumination projection 1170 of the light beams on the SLM 720. The seventh illumination projection 1170 includes second overlapping illumination patterns 1171 and 1172 of the same color modes of the overlapping illumination patterns 1154 and 1155, respectively. The second overlapping illumination patterns 1171 and 1172 may have uniform and nonoverlapping illumination areas on the SLM 720. The second overlapping illumination patterns 1171 and 1172 may be projected on respective pixels or pixel portions 1124 and 1125 at the SLM 720. According to the fourth hologram 1165, the second overlapping illumination patterns 1171 and 1172 may be projected to match the first arrangement of the overlapping illumination patterns 1154 and 1155 on the PLM 710.

To scroll the light beams on the SLM 720, the PLM 710 may be controlled according to a fifth voltage setting to form a fifth hologram 1185, which provides in a fifth subframe 1189 an eighth illumination projection 1190 of the light beams on the SLM 720. The fifth hologram 1185 causes the light beams of the sixth illumination projection 1160 to be reflected from the PLM 710 to the SLM 720 at different angles than the fourth hologram 1165 thereby scrolling the light beams on the surface of the SLM 720. The eighth illumination projection 1190 includes third overlapping illumination patterns 1191 and 1192 of the same color modes of the overlapping illumination patterns 1154 and 1155. The third overlapping illumination patterns 1191 and 1192 may have uniform and nonoverlapping illumination areas on the SLM 720. According to the fifth hologram 1185, the third overlapping illumination patterns 1191 and 1192 may be projected on the SLM 720 in a fourth arrangement different from the third arrangement of the overlapping illumination patterns 1154 and 1155. According to the fourth arrangement, the third overlapping illumination patterns 1191 and 1192 may be projected on the pixels or pixel portions 1125 and 1124 respectively.

The second illumination projection 1120, third illumination projection 1130, fifth illumination projection 1150, seventh illumination pattern 1170, and eighth illumination projection 1190 may be switched on the SLM 720 at a rate allowing the human eye to superimpose the second illumination patterns 1121 and 1122, third illumination patterns 1131 and 1132, fifth illumination pattern 1153, second overlapping illumination patterns 1171 and 1172, and third overlapping illumination patterns 1191 and 1192 in the same pixels or pixel portions 1124 and 1125 to perceive a single image according to the HDR image pattern 1101. The illumination patterns may be combined with additional illumination patterns in subsequent subframes to project a complete image.

Figure 12:
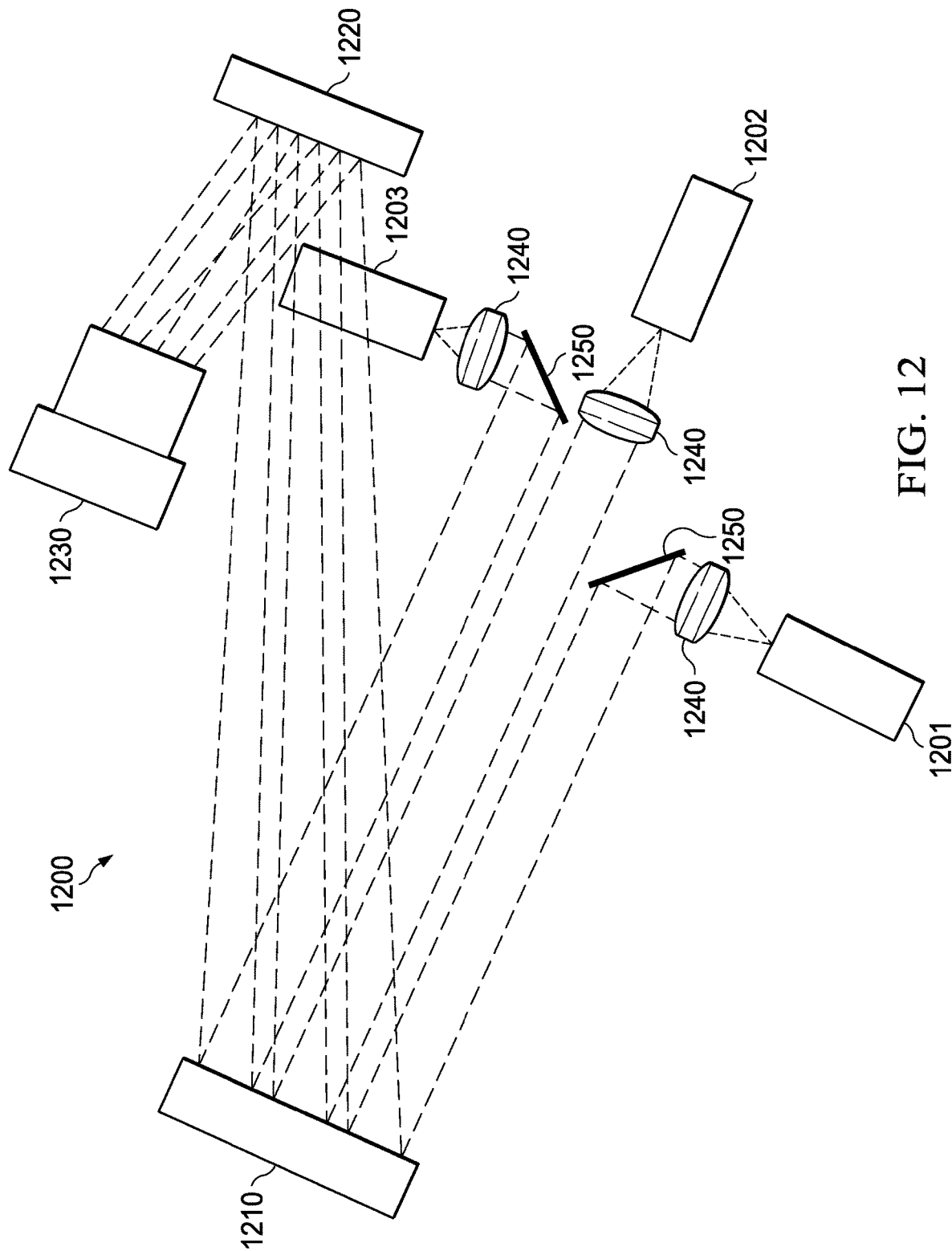
FIG. 12 is a block diagram of a display device, in accordance with various examples.

FIG. 12 is a block diagram of a display device 1200 which may be part of the display projector 110, in accordance with various examples. The display device 1200 may have a different arrangement of optical components than the display device 200 or the display device 700. In FIG. 12, the display device 1200 may include light sources 1201, 1202, and 1203, a PLM 1210, an SLM 1220, and a projection lens 1230. The light sources 1201, 1202, and 1203 may be any light emitting devices that emit respective light beams, in different wavelengths of different color modes, directed toward the PLM 1210. The display device 1200 may also include lenses 1240 positioned between the light sources 1201, 1202, and 1203, respectively, and the PLM 1210. Each one of the light sources 1201, 1202, and 1203 may be aligned with the respective lenses 1240. The lenses 1240 are designed for projecting the respective light beams from the light sources 1201, 1202, and 1203 onto a surface of the PLM 1210. The light beams may be reflected from the PLM 1210 onto the SLM 1220 without obstruction. In the example shown in FIG. 12, the light source 1203 may be placed behind the PLM 1210 and the SLM 1220 and behind the line of projection of the light beams between the PLM 1210 and the SLM 1220. In other examples, the light sources 1201, 1202 and 1203 may be positioned in any suitable arrangement that does not obstruct the lines of projections of the light beams between the components of the display device 1200.

The lenses 1240 may have approximately the same surface and may be positioned at respective distances and locations from the respective light sources 1201, 1202, and 1203 to provide uniform and nonoverlapping illumination patterns of the light beams on the surface of the PLM 1210. The display device 1200 may include one or more reflectors 1250 positioned between the PLM 1210 and one or more of the lenses 1240 and the PLM 1210. The reflectors 1250 may be mirrors that direct respective light beams from the one or more of the lenses 1240 to the PLM 1210. The reflectors 1250 may be useful for projecting parallel light beams from the one or more of the lenses 1240 on the surface of the PLM 710 and providing a compact arrangement of light sources 1201, 1202, and 1203 in the display projector 110.

For example, as shown in FIG. 12, a first reflector 1250 may be positioned between the light source 1201 and the PLM 1210. The reflector 1250 may have a reflective surface facing the light source 1201 at an approximately 45° angle to reflect the light beam from the light source 1201 at approximately 90° from the light source 1201 to the PLM 1210. Similarly, a second reflector 1250 may be positioned between the light source 1203 and the PLM 1210. The second reflector 1250 may also have a reflective surface facing the light source 1203 at an approximately 45° angle to reflect the light beam from the light source 1203 at approximately 90° from the light source 1203 to the PLM 1210. The light source 1202 may be facing the PLM 1210 to transmit a straight and undeflected light beam through a respective lens 1240 to the PLM 710. In other examples, the angles between the reflectors 1250 and the one or more the light sources 1201, 1202, and 1203 may be any suitable angle to project parallel light beams from the one or more the light sources 1201, 1202, and 1203 onto the surface of the PLM 710.

Figure 13:
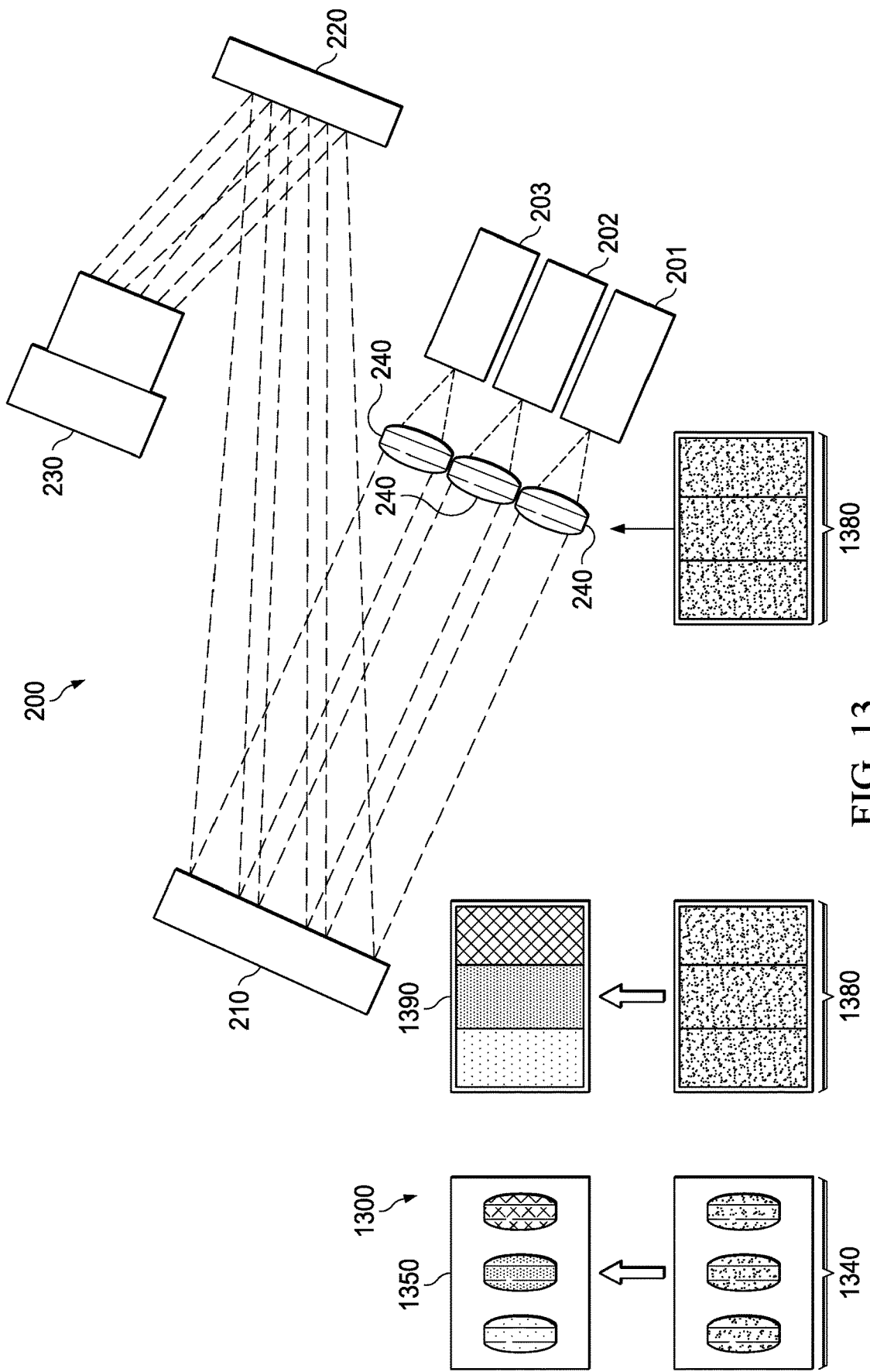
FIG. 13 is a block diagram of illumination patterns of a display device, in accordance with various examples.

FIG. 13 is a block diagram of illumination patterns 1300 that may be provided by any of the display devices 200, 700, and 1200, in accordance with various examples. As an example, the display device 200 is shown in FIG. 13. The illumination patterns 1300 may be provided by projecting the light beams from the respective light sources onto the surface of the PLM 210, 710, or 1210. The illumination patterns 1300 may be shaped based on the divergence angles and the spatial dimensions of the respective light beams and the shapes of the lenses in the display device 200, 700, or 1200. For example, responsive to the lenses in the display device 200, 700, or 1200 having similar elliptical shapes 1340, the illumination patterns 1300 may have nonoverlapping elliptical profiles 1350 on the surface of the PLM 210, 710, or 1210. In other examples, the display device 200, 700, or 1200 may include optical components 1380 having different curvatures in the x and y axes, such as cylindrical lenses, prism pairs, rectangular diffusers, light tunnels or rods. Accordingly, the illumination patterns 1300 may have nonoverlapping rectangular profiles 1390 on the surface of the PLM 210, 710, or 1210.

Figure 14:
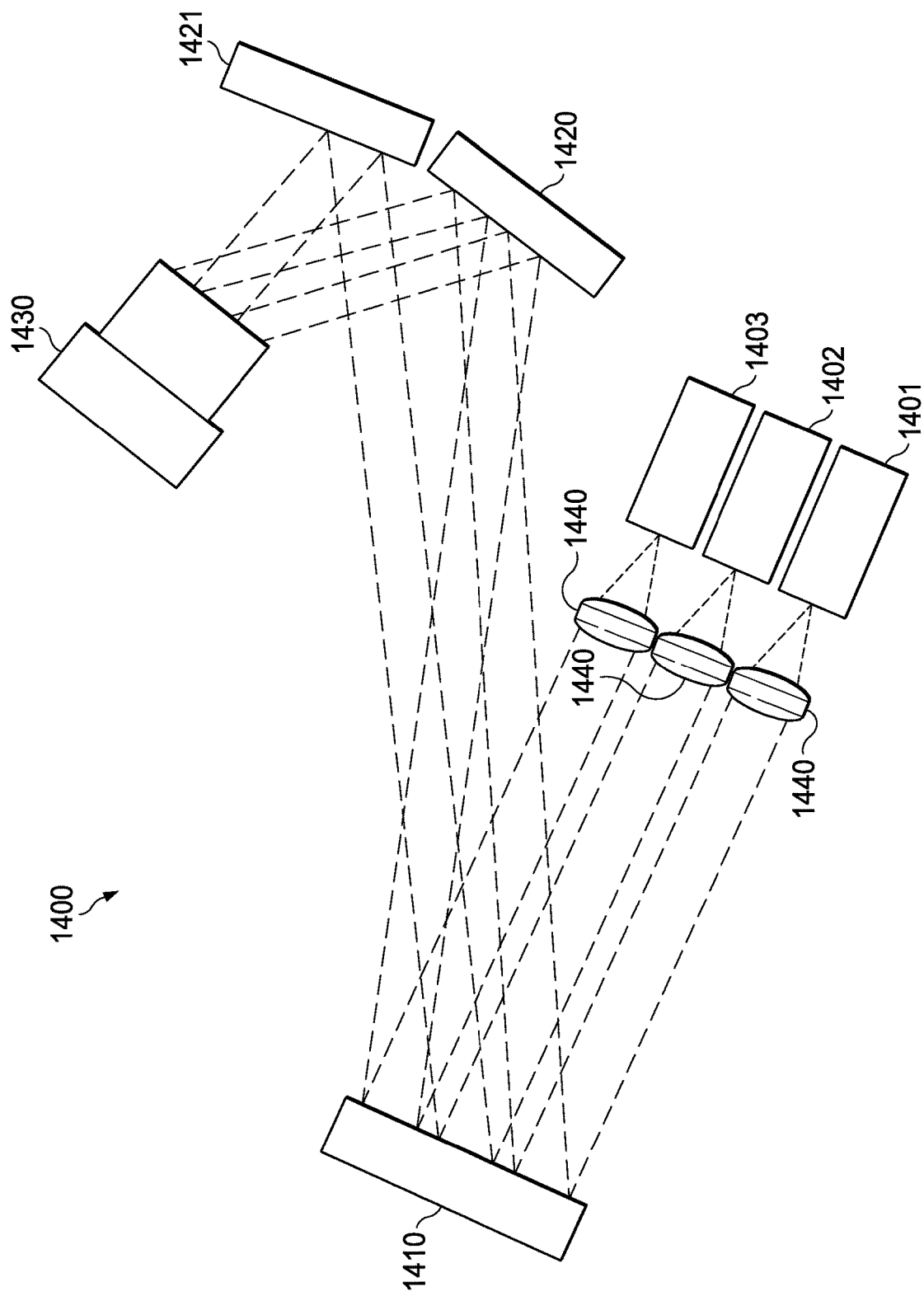
FIG. 14 is a block diagram of a display device, in accordance with various examples.

FIG. 14 is a block diagram of a display device 1400 which may be part of the display projector 110, in accordance with various examples. The display device 1400 may include multiple SLMs optically coupled to a PLM to scroll light beams from respective light sources. For example, the display device 1400 may include light sources 1401, 1402, and 1403, a PLM 1410, a first SLM 1420, a second SLM 1421, and a projection lens 1430. The light sources 1401, 1402, and 1403 may be any light emitting devices, such as laser light sources, that emit respective light beams in different wavelengths of different color modes. The display device 200 may also include lenses 1440 positioned between the light sources 1401, 1402, and 1403 and the PLM 1410. The PLM 1410 may be configured to reflect the projected light beams from the light sources 1401, 1402, and 1403 onto the first SLM 1420 and the second SLM 1421. Each one of the light beams may be projected by the PLM 1410 onto one of the first SLM 1420 and the second SLM 1421. In the example shown in FIG. 14, the PLM 1410 may reflect the light beams from the light sources 1401 and 1403 onto the first SLM 1420, and reflect the light beam from the light source 1402 onto the second SLM 1421. Accordingly, the PLM 1410 may scroll the light beams form the light sources 1401 and 1403 onto the first SLM 1420 and scroll the light beam from the light source 1402 onto the second SLM 1421. In other examples, a light beam from the same light source may be reflected by the PLM 1410 onto the first SLM 1420 and the second SLM 1421 in different image subframes. For example, the PLM 1410 may reflect the light beam from the light source 1402 onto the second SLM 1421 in a first subframe, and reflect the light beam from the light source 1402 onto the first SLM 1420 in a second subframe.

Figure 15:
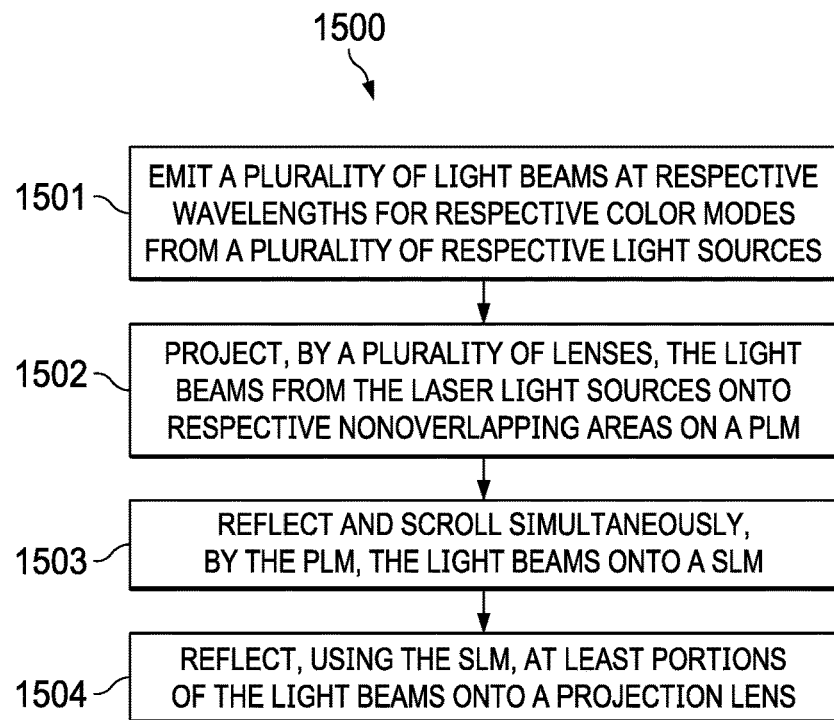
FIG. 15 is a flow diagram of a method for light projection using a PLM, in accordance with various examples.

FIG. 15 is a flow diagram of a method 1500 for light projection in the display device 200, 700, or 1200 of the display projector 110 in the display system 100, in accordance with various examples. At step 1501, light beams at respective wavelengths for respective color modes may be emitted from respective light sources. At least some of the light sources may be turned on continuously during the light projection process. For example, the light sources 201, 202, and 203 may emit respective light beams for the color modes including red, green, and blue to the PLM 210. At step 1502, the light beams from the laser light sources may be projected by respective lenses onto a PLM. The lenses may be useful to project uniform and nonoverlapping illumination patterns of the light beams on the surface of the PLM. For example, the lenses 240 provide similarly shaped and nonoverlapping illumination patterns for the light beams on the surface of the PLM 210.

At step 1503, the light beams may be reflected and scrolled by the PLM simultaneously onto an SLM. The PLM may be controlled with suitable voltages determined with respect to the color modes of the light beams to form holograms on the surface of the PLM. To form the holograms, the light beams with the different wavelengths of different color modes may be reflected with different phase levels on the PLM. Accordingly, the micromirrors of the PLM may be adjusted for different sections of micromirrors on the PLM, which reflect the respective color modes, such as red, green, and blue. This can be performed by applying different voltages to the different sections of micromirrors. The holograms may be changed for each subframe in a sequence of image subframes over a time period to scroll the reflected light beams of the color modes onto the surface of the SLM. The scrolling of the color modes can be quasi-continuous or stepped to discrete positions based on how the image is displayed. For example, the PLM may be controlled to provide holograms with time delays that cause discrete steps in the angles of reflection of the light beams on the SLM and accordingly cause scrolling the light beams in discrete steps on the SLM. In other examples, the PLM may be controlled to provide holograms at a rate that causes a quasi-continuous change in the angles of reflection of the light beams on the SLM and accordingly causes scrolling the light beams in quasi-continuous movement on the SLM.

At step 1504, at least portions of the light beams may be reflected by the SLM onto a projection lens. For example, the SLM 220 may reflect the light beams from the PLM 210 onto the projection lens 230 to project the image. The SLM 220 may be controlled by a voltage source to set the states of the micromirrors of the SLM 220 for reflecting portions of the light from the PLM 210 onto the projection lens 230 according to the bright and dark areas of the image. In other examples, the light beams may be reflected and scrolled by the PLM directly onto the projection lens or a display, such as the projection lens 230, without an SLM.

Figure 16:
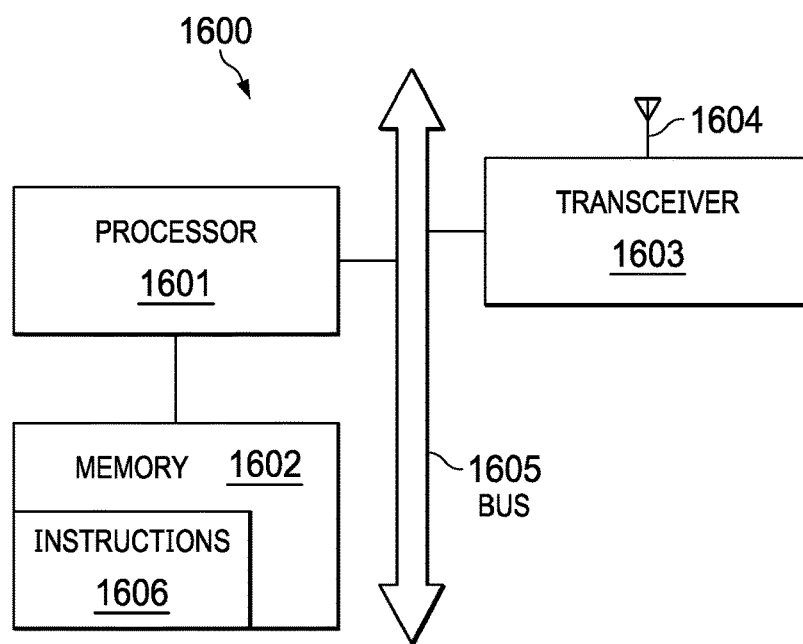
FIG. 16 is a block diagram of a processing system, in accordance with various examples.

FIG. 16 is a block diagram of a processing system 1600, in accordance with various examples. The processing system 1600 may be part of or coupled to the display system 100 and control components of the display projector 110 to display images or video. For example, the processing system 1600 may be part of the display projector 110 in the display system 100, such as the controller 250 of the display device 200. As shown in FIG. 16, the processing system 1600 may include one or more processors 1601 and one or more memories 1602. In some examples, the processing system 1600 may also include one or more transceivers 1603 and one or more antennas 1604 for establishing wireless connections. These components may be connected through a bus 1605, or in any other suitable manner. In FIG. 16, an example in which the components are connected through a bus 1605 is shown.

The processor 1601 may be configured to read and execute computer-readable instructions. For example, the processor 1601 may be configured to invoke and execute instructions stored in the memory 1602, including the instructions 1606. The processor 1601 may support one or more global systems for wireless communication. Responsive to the processor 1601 sending a message or data, the processor 1601 drives or controls the transceiver 1603 to perform the sending. The processor 1601 also drives or controls the transceiver 1603 to perform receiving, responsive to the processor 1601 receiving a message or data. Therefore, the processor 1601 may be considered as a control center for performing sending or receiving and the transceiver 1603 is an executor for performing the sending and receiving operations.

In some examples, the memory 1602 may be coupled to the processor 1601 through the bus 1605 or an input/output port (not shown). In other examples, the memory 1602 may be integrated with the processor 1601. The memory 1602 is configured to store various software programs and/or multiple groups of instructions, including instructions 1606. For example, the memory 1602 may include a high-speed random-access memory and/or may include a nonvolatile memory such as one or more disk storage devices, a flash memory, or another nonvolatile solid-state storage device. The memory 1602 may store an operating system such as ANDROID, IOS, WINDOWS, or LINUX. The memory 1602 may further store a network communications program. The network communications program is useful for communication with one or more attached devices, one or more user equipment, or one or more network devices, for example. The memory 1602 may further store a user interface program. The user interface program may display content of an application through a graphical interface and receive a control operation performed by a user on the application via an input control such as a menu, a dialog box, or a physical input device (not shown). The memory 1602 may be configured to store the instructions 1606 for implementing the various methods and processes provided in accordance with the various examples of this description.

The antenna 1604 may be configured to convert electromagnetic energy into an electromagnetic wave in free space or convert an electromagnetic wave in free space into electromagnetic energy in a transmission line. The transceiver 1603 may be configured to transmit a signal that is provided by the processor 1601 or may be configured to receive a wireless communications signal received by the antenna 1604. In this example, the transceiver 1603 may be considered a wireless transceiver.

The processing system 1600 may also include another communications component such as a Global Positioning System (GPS) module, a BLUETOOTH module, or a WI-FI module. The processing system 1600 may also support another wireless communications signal such as a satellite signal or a short-wave signal. The processing system 1600 may also be provided with a wired network interface or a local area network (LAN) interface to support wired communication.

In various examples, the processing system 1600 may further include an input/output device (not shown) such as an audio input/output device, a key input device, a display, and the like. The input/output device may be configured to implement interaction between the processing system 1600 and a user/an external environment and may include the audio input/output device, the key input device, the display, and the like. The input/output device may further include a camera, a touchscreen, a sensor, and the like. The input/output device may communicate with the processor 1601 through a user interface.

The processing system 1600 shown in FIG. 16 is an example of implementation in various examples of this description. During actual application, the processing system 1600 may include more or fewer components.

The term "couple" appears throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A system or device that is described herein as including certain components may instead be adapted to be coupled to those components to form the described system or device.

While certain components may be described herein as being of a particular process technology, these components may be exchanged for components of other process technologies. Systems and devices described herein are reconfigurable to include the replaced components to provide functionality at least partially similar to functionality available prior to the component replacement.

Unless otherwise stated, "about," "approximately," or "substantially" preceding a value means+/−10 percent of the stated value. Modifications are possible in the described examples, and other examples are possible within the scope of the claims.

What is claimed is:

1. An apparatus comprising:
a first light source configured to produce a first light beam having a first color;
a second light source configured to produce a second light beam having a second color;

a spatial light modulator (SLM) having a first region and a second region; and a phase light modulator (PLM) optically coupled to the first light source, to the second light source, and to the SLM, the PLM configured to:
  direct the first light beam towards the first region of the SLM; and
  direct the second light beam towards the second region of the SLM.

2. The apparatus of claim 1, further comprising a projection lens optically coupled to the PLM.

3. The apparatus of claim 1, wherein the PLM is configured to direct the first light beam and the second light beam onto regions of pixels on the SLM according to a high dynamic range (HDR) modulation.

4. The apparatus of claim 1, wherein the SLM is a first SLM, the apparatus further comprising a second SLM, and wherein the PLM is configured to reflect the first light beam onto the second SLM and the second light beam light onto the first SLM.

5. The apparatus of claim 4, wherein the PLM is configured to scroll the first light beam onto a surface of the second SLM and to scroll the second light beam onto a second surface of the first SLM.

6. The apparatus of claim 1, further comprising:
  a first lens optically coupled between the first light source and the PLM; and
  a second lens optically coupled between the second light source and the PLM.

7. The apparatus of claim 1, wherein the first region of the SLM is non-overlapping with the second region of the SLM.

8. The apparatus of claim 1, wherein the first region is elliptical or rectangular and the second region is elliptical or rectangular.

9. The apparatus of claim 1, wherein the second region is larger than the first region.

10. The apparatus of claim 1, further comprising a dichroic mirror or a polarizing beam splitter (PBS) optically coupled between the first light source and the PLM.

11. The apparatus of claim 1, wherein the PLM is configured to:
  during a first time period, direct the first light beam towards the first region of the SLM and direct the second light beam towards the second region of the SLM; and
  during a second time period, direct the first light beam towards the second region of the SLM and direct the second light beam towards a third region of the SLM.

12. The apparatus of claim 1, further comprising a third light source optically coupled to the PLM, the third light source configured to produce a third light beam having a third color, and the PLM further configured to direct the third light beam towards a third region of the SLM.

13. The apparatus of claim 1, wherein the PLM is configured to:
  during a first time period, direct the first light beam towards the first region of the SLM and direct the second light beam towards the second region of the SLM; and
  during a second time period, direct the first light beam towards the second region of the SLM and direct the second light beam towards the first region of the SLM.

14. A display device comprising:
  a first laser configured to produce a first light beam having a first color;
  a second laser configured to produce a second light beam having a second color;
  a spatial light modulator (SLM) having a first region and a second region;
  a phase light modulator (PLM) optically coupled to the SLM;
  a first lens optically coupled between the first laser and the PLM, the first lens configured to direct the first light beam towards the PLM; and
  a second lens optically coupled between the second laser and the PLM, the second lens configured to direct the second light beam towards the PLM; and
  wherein the SLM is configured to:
    direct the first light beam towards the first region of the SLM; and
    direct the second light beam towards the second region of the SLM.

15. The display device of claim 14, wherein the first region of the SLM overlaps the second region of the SLM.

16. The display device of claim 14, wherein the PLM is coupled to a controller, and wherein the controller is configured to control the PLM.

17. The display device of claim 16, wherein the controller is configured to control the PLM to:
  during a first time period, direct the first light beam towards the first region of the SLM and direct the second light beam towards the second region of the SLM; and
  during a second time period, direct the first light beam towards the second region of the SLM and direct the second light beam towards a third region of the SLM.

18. The display device of claim 16, wherein the controller is configured to control the PLM in accordance with a high dynamic range (HDR) modulation to cause brighter illumination in the first light beam and the second light beam at different locations according to an HDR image pattern.

19. An apparatus comprising:
  a first light source configured to produce a first light beam having a first color;
  a second light source configured to produce a second light beam having a second color;
  a projection lens;
  a spatial light modulator (SLM) optically coupled to the projection lens, the spatial light modulator having a first region and a second region; and
  a phase light modulator (PLM) optically coupled between the first light source and the SLM and between the second light source and the SLM, the PLM configured to:
    direct the first light beam towards the first region of the SLM; and
    direct the second light beam towards the second region of the SLM.

20. The apparatus of claim 19, wherein the PLM is configured to reflect the first light beam from the first light source towards the SLM in an image subframe, and wherein the second light source is switched off during the image subframe.

* * * * *